US012073993B2

(12) United States Patent
Fujinaka et al.

(10) Patent No.: US 12,073,993 B2
(45) Date of Patent: Aug. 27, 2024

(54) BOND MAGNET AND MANUFACTURING METHOD OF THE SAME

(71) Applicant: DENSO CORPORATION, Kariya (JP)

(72) Inventors: Tomonori Fujinaka, Kariya (JP); Yoshiaki Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 95 days.

(21) Appl. No.: 17/667,777

(22) Filed: Feb. 9, 2022

(65) Prior Publication Data

US 2022/0310295 A1 Sep. 29, 2022

(30) Foreign Application Priority Data

Mar. 26, 2021 (JP) ................................ 2021-053402

(51) Int. Cl.
*H01F 7/02* (2006.01)
*H01F 41/02* (2006.01)

(52) U.S. Cl.
CPC ......... *H01F 7/021* (2013.01); *H01F 41/0266* (2013.01); *H01F 41/0273* (2013.01)

(58) Field of Classification Search
CPC .. H01F 7/021; H01F 41/0266; H01F 41/0273; H01F 1/083; H01F 1/113; H01F 41/028; H01F 13/003; H01F 41/0253; H02K 1/2733
See application file for complete search history.

(56) References Cited

U.S. PATENT DOCUMENTS

2010/0065156 A1* 3/2010 Honkura ............... H01F 1/0558 148/103
2012/0091832 A1* 4/2012 Soderberg .............. C22C 33/02 310/156.01
2016/0093426 A1* 3/2016 Yoshida ................. H01F 7/021 29/608
2016/0303788 A1 10/2016 Ihara et al.
2017/0125164 A1 5/2017 Yoshida et al.
2018/0215854 A1 8/2018 Paranthaman et al.
2018/0236724 A1 8/2018 Compton et al.
2020/0188996 A1 6/2020 Sethuraman et al.
2020/0223099 A1 7/2020 Kim et al.
2021/0104361 A1 4/2021 Yoshida et al.
2021/0335539 A1 10/2021 Degner et al.

FOREIGN PATENT DOCUMENTS

JP H0580167 U * 10/1993
JP 2016-189462 A 11/2016
JP 2019195070 A * 11/2019
WO WO-9101562 A1 * 2/1991

OTHER PUBLICATIONS

Kokkinis, Dimitri et al. "Multimaterial Magnetically Assisted 3D Printing of Composite Materials." Nature Communications, vol. 6, No. 1, 2015.

* cited by examiner

*Primary Examiner* — Mohamad A Musleh
(74) *Attorney, Agent, or Firm* — Posz Law Group, PLC

(57) ABSTRACT

A bond magnet includes filaments bonded with each other to form a shape of the bond magnet. Each of the filaments is a filamentous member including a resin material and magnetic powder dispersed in the resin material, and has magnetic anisotropy for high degree of freedom of magnetic flux direction and high surface magnetic flux density on a working surface.

8 Claims, 27 Drawing Sheets

A1 / B1 = 2.8

A1 / B1 = 1.4

A1 / B1 = 0.7

BOND MAGNET AND MANUFACTURING METHOD OF THE SAME

CROSS REFERENCE TO RELATED APPLICATION

The present application is based on and claims the benefit of priority of Japanese Patent Application No. 2021-053402, filed on Mar. 26, 2021, the disclosure of which is incorporated herein by reference.

TECHNICAL FIELD

The present disclosure generally relates to a bond magnet and a method for manufacturing the same.

BACKGROUND INFORMATION

A comparative example discloses a bond magnet in which magnetic powder is dispersed/spread in a resin material. The bond magnet in the comparative example has a cylindrical shape or a ring/annulus shape. The bond magnet is manufactured by resin-molding a magnet piece having a shape divided into a plurality of pieces in the circumferential direction using a mold. In resin molding using a mold, magnetic powder is magnetized by resin molding in a state where a magnetic field is formed in the internal space of the mold.

In the comparative bond magnet described above, the direction of the magnetic flux inside the bond magnet is determined by the magnetic field formed in the internal space of the mold. However, the degree of freedom regarding the direction of the magnetic field lines of the magnetic field formed in the internal space of the mold is low. Therefore, in the conventional bond magnet described above, the degree of freedom regarding the direction of the magnetic flux inside the bond magnet is low. Further, in the above-mentioned conventional method for manufacturing a bond magnet, a ring-shaped/annulus-shaped bond magnet having a high surface magnetic flux density on a working surface cannot be obtained.

SUMMARY

It is an object of the present disclosure to provide a bond magnet having a high degree of freedom in the direction of the magnetic flux inside the bond magnet and a method for manufacturing the same. Another object of the present disclosure is to provide a ring/annulus-shaped bond magnet having a high surface magnetic flux density on the working surface and a method for manufacturing the same.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, embodiments of the present disclosure are described with reference to the drawings. In the following embodiments, the same or equivalent parts are denoted by the same reference signs.

First Embodiment

Figure 1:
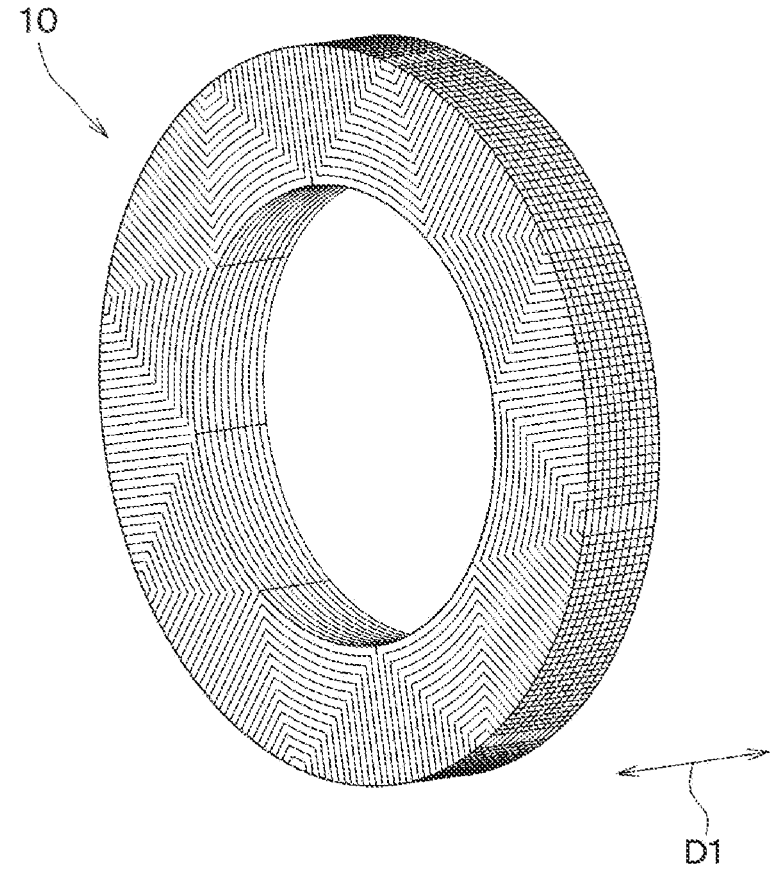
FIG. 1 is a perspective view of a bond magnet according to a first embodiment.
Figure 2:
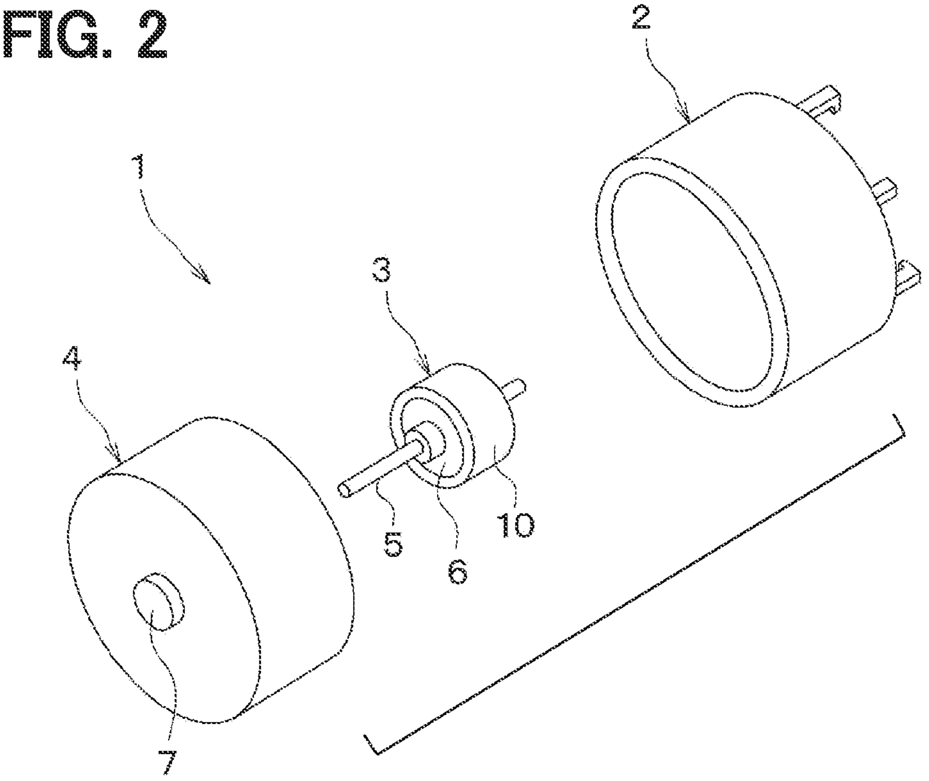
FIG. 2 is a schematic exploded perspective view of a motor using the bond magnet of FIG. 1.

A bond magnet 10 of the present embodiment shown in FIG. 1 is a polar anisotropic magnet used in an inner rotor 3 of an inner rotor type motor 1 shown in FIG. 2. The bond magnet 10 has a hollow ring shape for weight reduction.

The motor 1 shown in FIG. 2 is a permanent magnet synchronous motor. The motor 1 includes a stator 2, an inner rotor 3, and a housing 4.

Although not shown, the stator 2 includes an iron core and windings. The stator 2 generates a magnetic force that rotates the inner rotor 3. The inner rotor 3 is a rotating body arranged inside the stator 2. The inner rotor 3 includes a rotating shaft 5, a yoke 6, and the bond magnet 10. The yoke 6 is arranged inside the bond magnet 10. The yoke 6 adjusts the magnetic force. The rotating shaft 5 is arranged at the center of the yoke 6.

Figure 3:
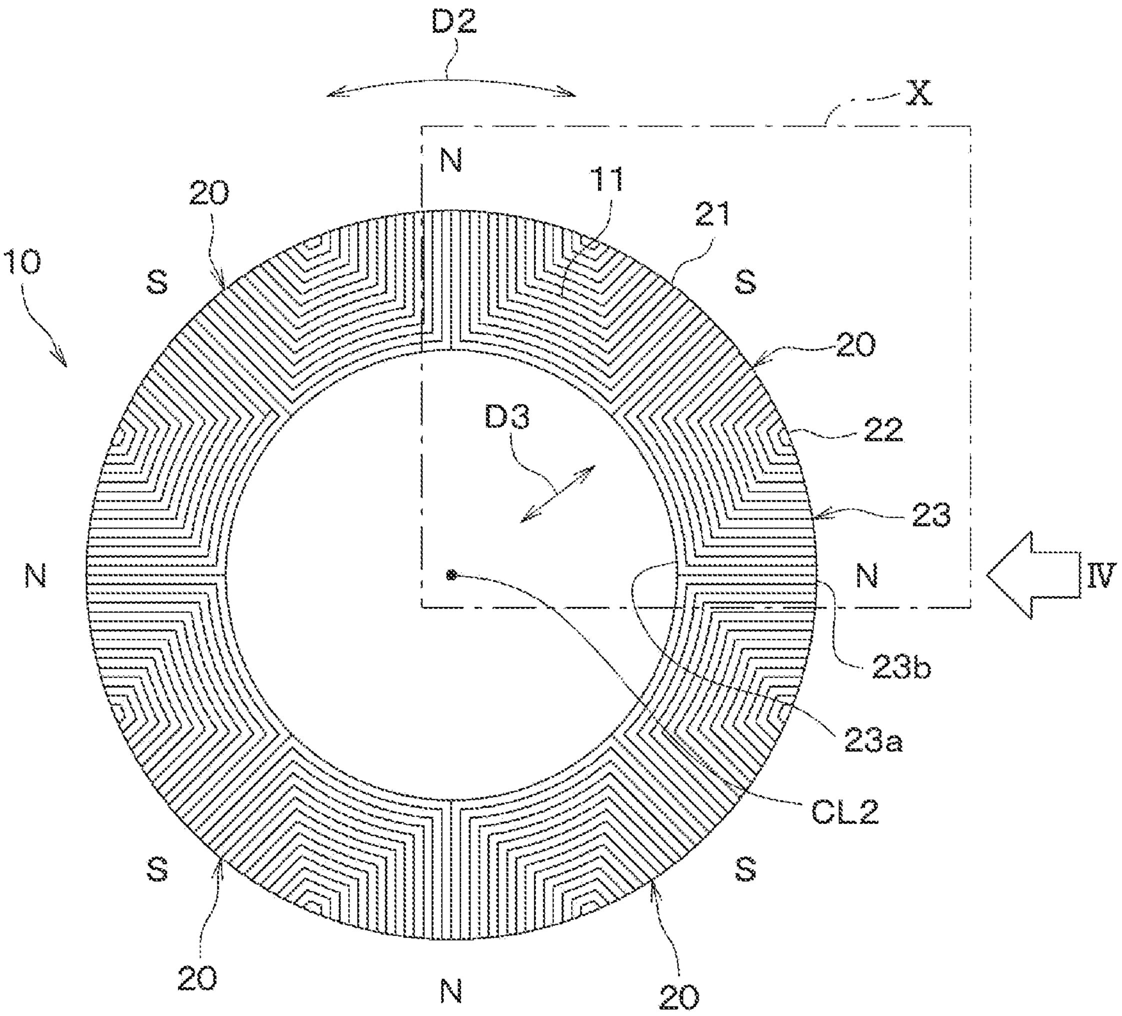
FIG. 3 is a plan view of the bond magnet of FIG. 1.

When the inner rotor 3 is arranged inside the stator 2, an outer peripheral surface of the bond magnet 10 faces the winding of the stator 2. As shown in FIG. 3, there are 8 magnetic poles on the outer peripheral surface of the bond magnet 10. The housing 4 houses the stator 2 and the inner rotor 3. The housing 4 has a bearing 7 that rotatably supports the rotating shaft 5.

Figure 4:
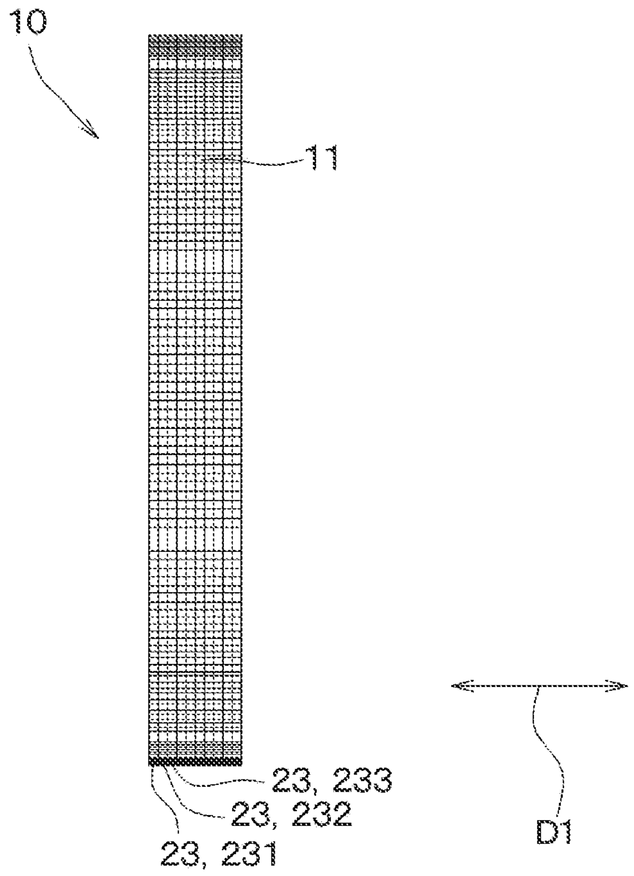
FIG. 4 is a IV arrow view of the bond magnet of FIG. 3.

As shown in FIGS. 3 and 4, the bond magnet 10 is composed of an aggregate of a plurality of filaments 11. In other words, the bond magnet 10 includes a plurality of filaments 11 that are coupled to each other to form the shape of the bond magnet 10. Each of the plurality of filaments 11 is a permanent magnet having magnetic anisotropy.

Figure 5:
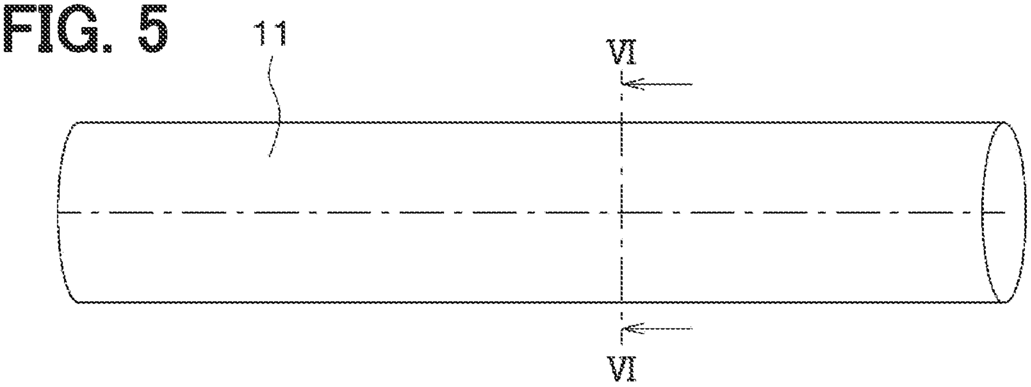
FIG. 5 is a perspective view of one filament of FIG. 3.

As shown in FIG. 5, each filament 11 is a thread-like member. The thickness of each filament 11 is uniform over the entire filament 11. The thickness of each of the plurality of filaments 11 is the same.

Figure 6:
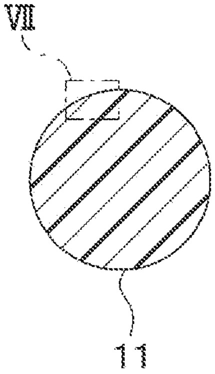
FIG. 6 is a cross-sectional view taken along a VI-VI line of the filament of FIG. 5.

As shown in FIG. 6, the cross-sectional shape of each filament 11 is circular. The circular shape includes not only a perfect circle but also a shape close to a perfect circle, an ellipse, and the like. Note that, in FIG. 4, the cross-sectional shape of each filament 11 is shown as a square for simplification of the illustration. The cross-sectional shape of each filament 11 may be other shapes such as a polygon or the like.

Each filament 11 contains a resin material and magnetic powder dispersed in the resin material. The resin material and the magnetic powder are mixed in a predetermined ratio. As the resin material, a thermoplastic resin and a thermoplastic elastomer are used. Examples of the thermoplastic resin include polypropylene, polyethylene, polyvinyl chloride, polyester, polyamide, polycarbonate, polyphenylene sulfide, acrylic resin, polycaprolactone and the like. As the magnetic powder, powders of magnetic materials such as ferrite, Sm—Co, Nd—Fe—B, and Sm—Fe—N and the like are used. As the magnetic powder, it is preferable to use magnetic anisotropy magnetic powder rather than magnetic isotropic magnetic powder.

Figure 7:
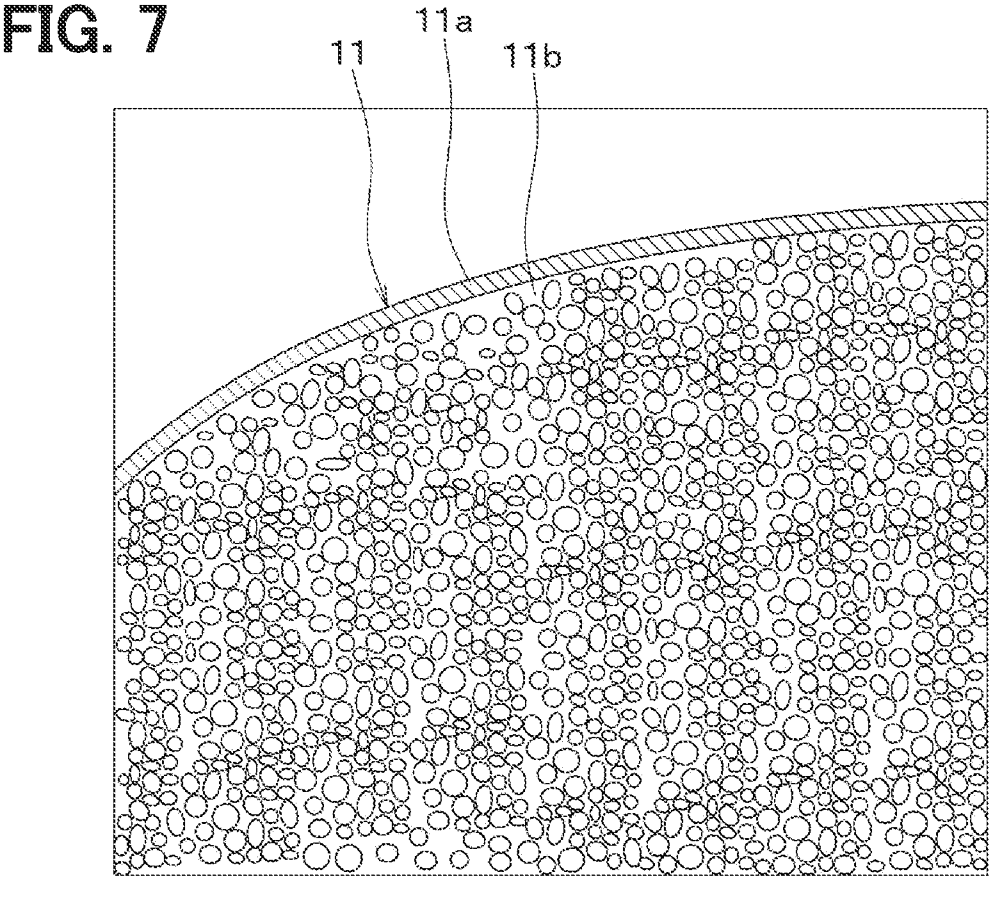
FIG. 7 is an enlarged view of part VII of FIG. 6.

FIG. 7 is an enlarged view of part VII in FIG. 6. In the filament 11 in FIG. 7, a granular portion is each particle of magnetic powder, and a portion other than the granular portion is a resin material. As shown in FIG. 7, a surface layer portion 11*a* of each filament 11 has a larger ratio of the resin material to the magnetic powder than a center portion 11*b* of each filament 11 on a central/lower side of the surface layer portion 11*a*. As described later, this is because the composite material of the magnetic powder and the resin material in which a molten resin material carries the magnetic powder is extruded from a tip of a nozzle of a bond magnet manufacturing apparatus, and the molten resin material is cooled and solidified to form the filament 11. The average thickness of the surface layer portion 11*a* is 1 to 500 μm. The average particle size (i.e., diameter) of the magnetic powder is 0.01 to 1000 μm. The distance between the magnetic particles is 0 to 1000 μm. Note that, in FIG. 7, in order to show the surface layer portion 11*a* in an easy-to-understand manner, the surface layer portion 11*a* is hatched.

Figure 8:
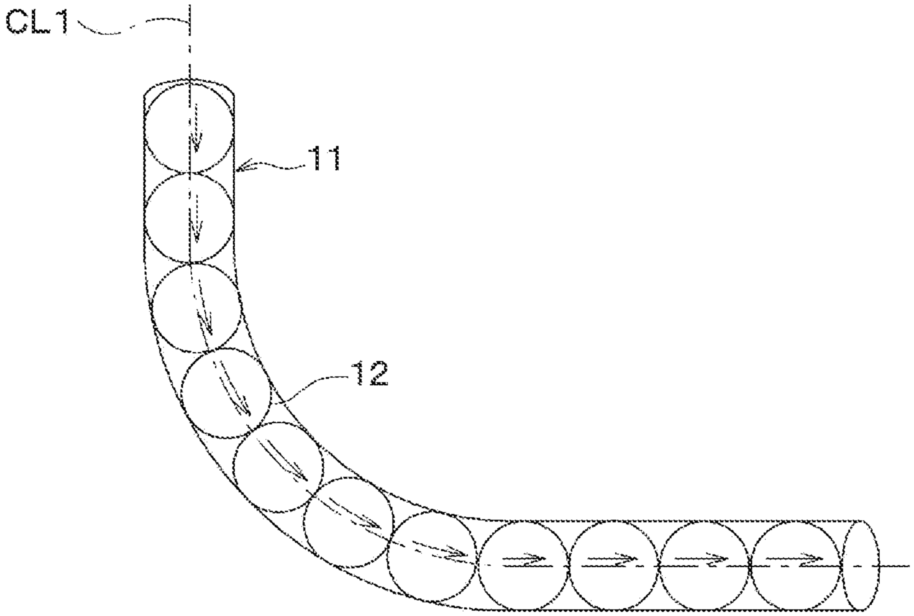
FIG. 8 is a schematic view showing the configuration of one filament in the first embodiment.

As shown in FIG. 8, in each filament 11, the direction of the magnetic moment of the magnetic powder 12 at each of different portions is aligned with the direction along the center line CL1 of the filament 11. The direction along the center line CL1 is a direction along the direction parallel to the center line CL1. The direction along the center line CL1 is a direction substantially parallel to the center line CL1. In FIG. 8, in one filament 11, the particles of the representative magnetic powder 12 at each of different portions in the direction along the center line CL1 of the filament 11 are enlarged and illustratively shown. The arrow shown in the magnetic particle 12 in FIG. 8 indicates the magnetic moment. The tip of the arrow points to the north pole. The direction of the magnetic moment of the magnetic powder 12 shown in FIG. 8 corresponds to the direction of the total magnetic moment of each of the particle of the magnetic powder 12. As described above, the direction of the magnetic moment of the magnetic powder 12 is a direction that is set to have a predetermined angle with respect to the center line CL1. In the present embodiment, the predetermined angle is 180 degrees. "A direction that is set to have a predetermined angle" means a direction within a range of plus or minus 10 degrees with respect to a reference (i.e., a center line, in this case).

Note that the magnetic moments of all the particles of the magnetic powder 12 at each of the different portions of the filament 11 do not completely have to be set to the direction along the center line CL1. That is, as long as the direction of the magnetic moment of the magnetic powders, which is the sum of the magnetic moments of each particle of the magnetic powder 12 at each of different portions, is set to have a predetermined angle with respect to the center line CL1 of the filament 11, it is OK.

In a bent portion of the filament 11, "with respect to the center line CL1" means "with respect to a tangential direction of the center line CL1." That is, in the bent portion of the filament 11, the direction of the magnetic moment of the magnetic powder 12 is a direction at (i.e., set to have) a predetermined angle with respect to the tangential direction of the center line CL1.

Figure 9:
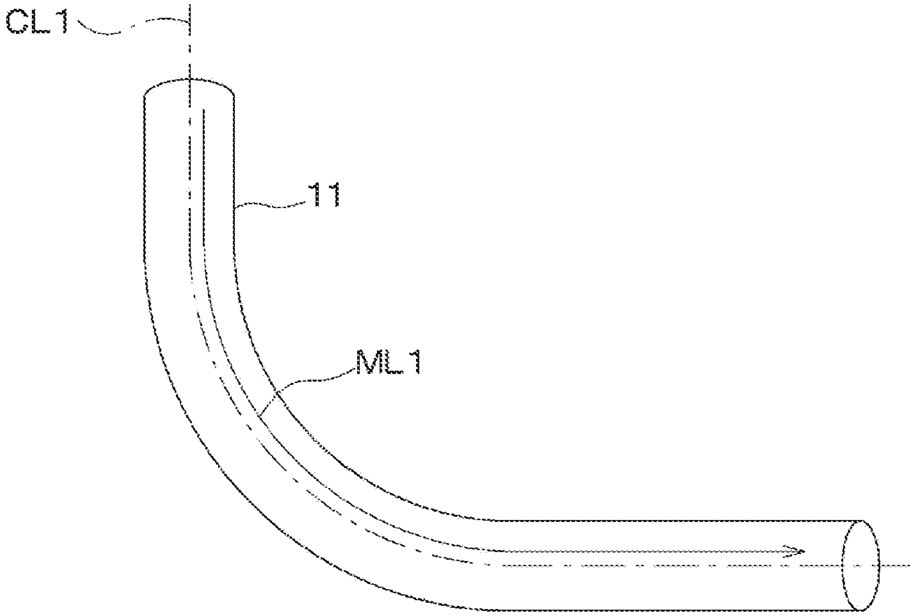
FIG. 9 is a schematic view showing the direction of magnetic flux inside one filament in the first embodiment.

Therefore, as shown in FIG. 9, the direction of the magnetic flux inside the filament 11 is the direction along the center line CL1 of the filament 11. FIG. 9 shows a magnetic flux line ML1 representing the magnetic flux inside the filament 11. At the portion where the filament 11 is bent, the magnetic flux line ML1 is bent following the bending of the center line CL. That is, even in the bent portion of the filament 11, the direction of the magnetic flux line ML1 is/extends along the center line CL1. As described above, the direction of the magnetic flux inside the filament 11 is a direction at (i.e., set to have) a predetermined angle with respect to the center line CL1 of the filament 11.

Figure 10:
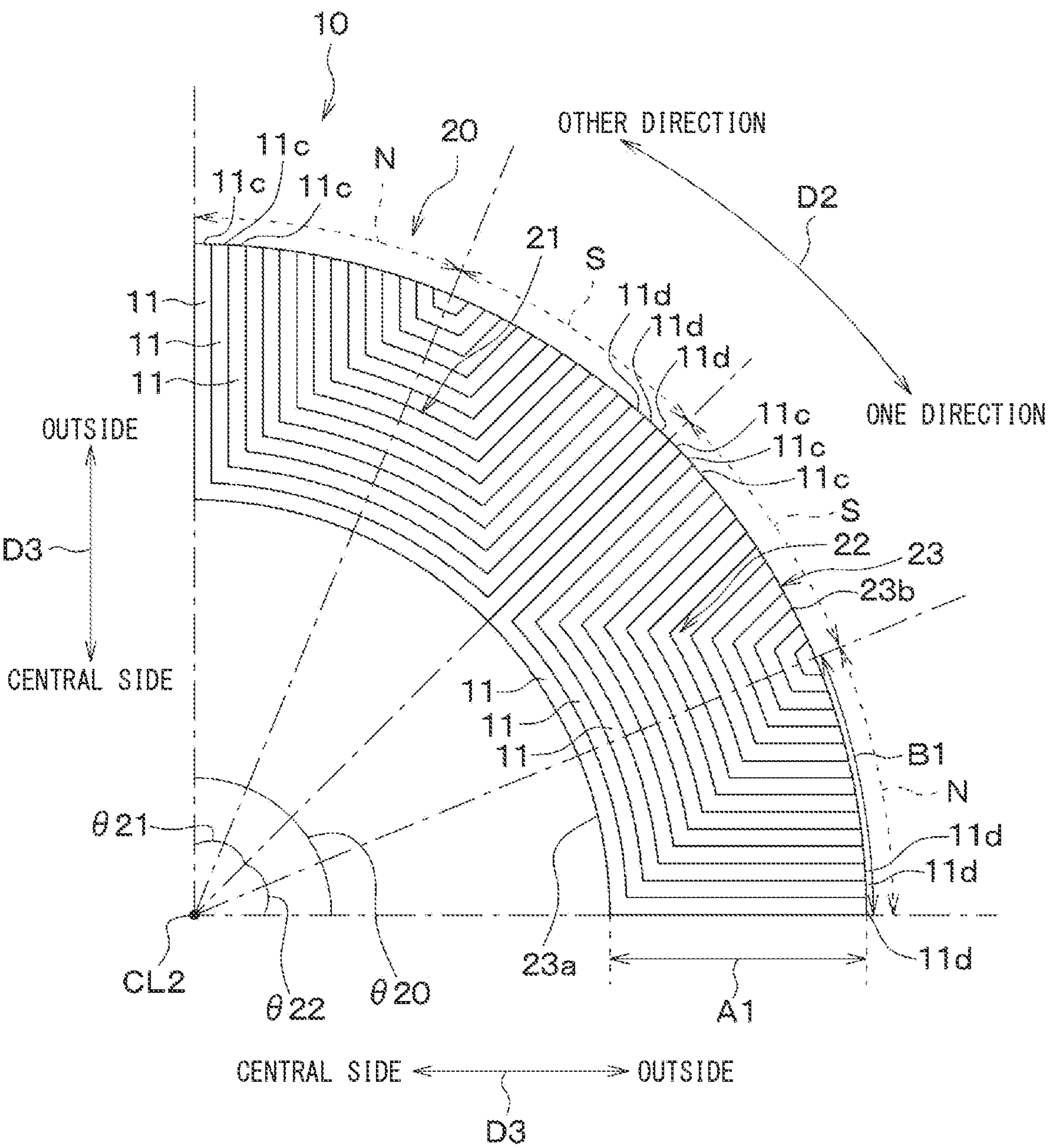
FIG. 10 is an enlarged view of an X portion of the bond magnet of FIG. 3.

The bond magnet 10 of the present embodiment is described in more details. As shown in FIG. 3, the bond magnet 10 includes a plurality of sets of basic components 20 in which a first component 21 and a second component 22 are provided as a set of basic components 20. FIG. 10 shows a set of basic components 20 in (i.e., picked up from) FIG. 3. As shown in FIG. 3, each of the plurality of sets of basic components 20 is aligned with each other in a circumferential direction D2 with respect to a center line CL2. As a result, the plurality of sets of basic components 20 form one ring-shaped body 23. The circumferential direction D2 with respect to the center line CL2 means a circumferential direction of the circle centered on the center line CL2.

The ring-shaped body 23 has an inner peripheral surface 23*a* in an inside in a radial direction D3 with respect to the center line CL2 of the ring-shaped body 23 and an outer peripheral surface 23*b* on an outside in the radial direction D3 of the ring-shaped body 23. The radial direction D3 with respect to the center line CL2 means a radial direction of the circle centered on the center line CL2. As shown in FIG. 4, the bond magnet 10 is composed of a laminated body in which a plurality of ring-shaped bodies 23 are laminated along a direction D1 parallel to the center line CL2.

As shown in FIG. 10, the width of the annular shape 23 along the radial direction D3 is defined as A1. Let B1 be the length of a sector arc having a radius equal to the radius of the outer peripheral surface 23*b* and a central angle of 22.5 degrees. In such configuration, A1/B1=1.0.

As shown in FIG. 10, a set of basic components 20 corresponds to one in which the ring-shaped body 23 is divided into predetermined central angles 820 along the circumferential direction D2. In each of the plurality of sets of basic components 20, the second component 22 is adjacent to one side in the circumferential direction D2 with respect to the first component 21. In the present embodiment, one direction of the circumferential direction D2 is a clockwise direction of the circumferential direction D2. The other direction of the circumferential direction D2 is a counterclockwise direction of the circumferential direction D2. The first component 21 and the second component 22 correspond to one and the other of a set of basic components 20 divided equally along the circumferential direction D2. The central angles θ21 and θ22 of the first component 21 and the second component 22, respectively, are ½ of the central angle θ20 of the basic component 20. In the present embodiment, the bond magnet 10 includes four sets of basic components 20. The central angle θ20 of one set of basic components 20 is 90 degrees. The central angles θ21 and 22 of the first component 21 and the second component 22, respectively, are 45 degrees.

Further, in one set of basic components 20, one half of a region of the outer peripheral surface of the first component 21 on an opposite/other side in the circumferential direction D2 is the N (north) pole. One half of the outer peripheral surface of the first component 21 on one side (relative to the other side described above) in the circumferential direction D2 is the S (south) pole.

The first component 21 is composed of at least a plurality of filaments 11 bonded to each other. The plurality of first filaments 11 are arranged adjacent to each other.

A one end 11*c* of each of the plurality of first filaments 11 of the first component 21 is located on the outer peripheral surface 23*b* of the ring-shaped body 23. An other end 11*d* of each of the plurality of first filaments 11 of the first component 21 is located on one side of the outer peripheral surface 23*b* of the ring-shaped body 23 with respect to the one end 11*c* in the circumferential direction D2.

Each of the plurality of filaments 11 of the first component 21 extends in a U shape from the one end 11*c* to the other end 11*d*. More specifically, each of the plurality of filaments 11 of the first component 21 extends and spreads along the radial direction D3 from the one end 11*c* toward an inner peripheral surface 23*a*, and changes its direction to the circumferential direction D2 to extend and spread in one direction, and further changes its direction toward the other end 11*d* to extend and spread along the radial direction D3. Of the plurality of filaments 11 of the first component 21, the portions extending along the circumferential direction D2 are arranged in the radial direction D3.

As described in FIG. 8, in each of the plurality of filaments 11 of the first component 21, the direction of the magnetic moment of the magnetic powder 12 at each portion along the center line CL1 of the filament 11 is aligned along the center line CL1 of the filament 11. The magnetic pole on the one end 11*c* is the N pole, and the magnetic pole on the other end 11*d* is the S pole. In the present embodiment, the N pole corresponds to a first pole. The S pole corresponds to a second pole.

Like the first component 21, the second component 22 is composed of at least a plurality of filaments 11 bonded to each other. The arrangement of the plurality of filaments 11 of the second component 22 is the same as that of the first component 21.

As described in FIG. 8, in each of the plurality of filaments 11 of the second component 22, the direction of the magnetic moment of the magnetic powder 12 along the center line CL1 at each portion is set along a direction that extends along the center line CL1 of the filament 11. The magnetic pole on the one end 11*c* is the S pole, and the magnetic pole on the other end 11*d* is the N pole. As described above, the direction of the magnetic moment of the magnetic powder 12 in the plurality of filaments 11 of the second component 22 is opposite to the direction of the magnetic moment of the magnetic powder 12 in the plurality of filaments 11 of the first component 21.

As shown in FIG. 4, in the bond magnet 10 of the present embodiment, a plurality of ring-shaped bodies 23 are laminated/stacked. That is, the above-mentioned one ring-shaped body 23 is a first ring-shaped body 231. A second ring-shaped body 232 having the same structure as the first ring-shaped body 231 is laminated in the direction D1 parallel to the center line CL2 of the first ring-shaped body 231 with respect to the first ring-shaped body 231. Further, an other ring-shaped body 233 having the same structure as the first ring-shaped body 231 is laminated in the direction D1 parallel to the center line CL2 of the first ring-shaped body 231 with respect to the second ring-shaped body 232. The phases of the magnetic poles existing on the outer peripheral surfaces of the first ring-shaped body 231 and the second ring-shaped body 233 are matched to each other.

The bond magnet 10 of the present embodiment is composed of a laminated body of the plurality of ring-shaped bodies 23. However, the bond magnet 10 may also be composed of only one ring-shaped body 23.

Next, a method of manufacturing the bond magnet 10 of the present embodiment is described. The bond magnet 10 is manufactured by the Fused Deposition Modeling method using a bond magnet manufacturing apparatus 30 shown in FIG. 11. The Fused Deposition Modeling method is also called a melt deposition method.

Figure 11:
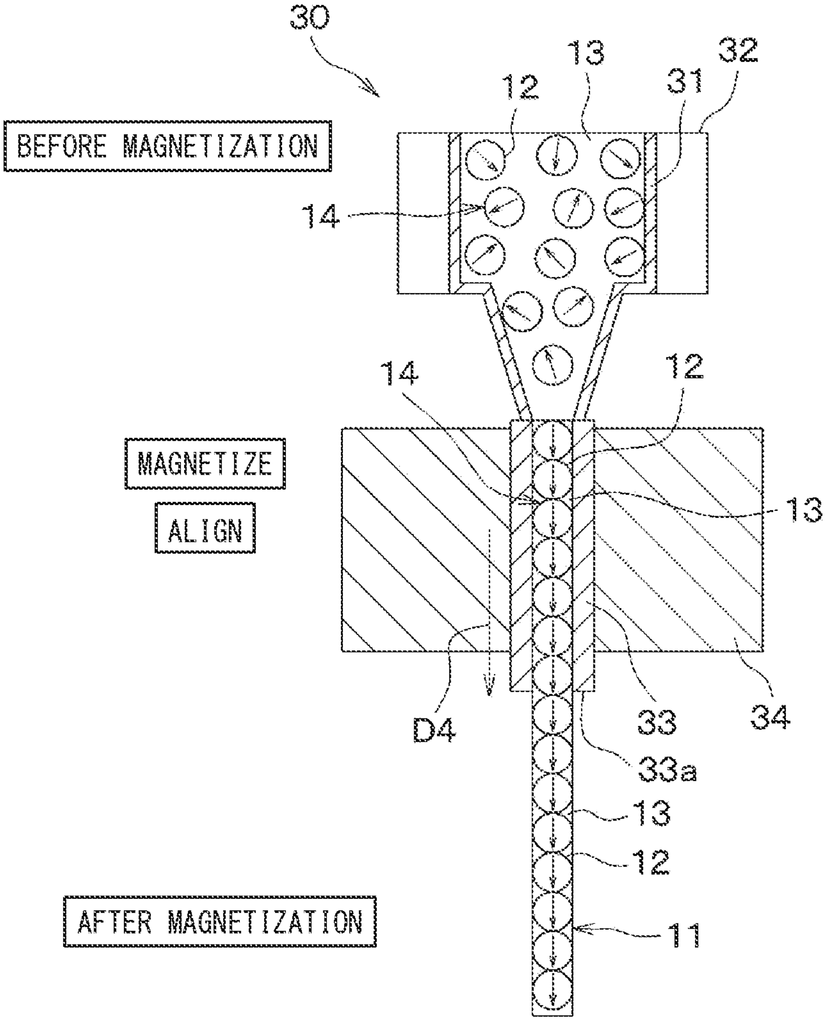
FIG. 11 is a cross-sectional view of a bond magnet manufacturing apparatus according to the first embodiment.

As shown in FIG. 11, the bond magnet manufacturing apparatus 30 includes a container 31, a heater 32, a nozzle 33, and a magnet 34. The container 31 internally houses the composite material 14 containing the resin material 13 and the magnetic powder 12. The heater 32 is arranged outside the container 31. The heater 32 heats the composite material 14 housed inside the container 31 and melts the resin material 13 in the composite material 14. The nozzle 33 has a tubular shape that extends linearly in one direction as its axial direction. The nozzle 33 allows the composite material 14 in which the resin material 13 is melted to pass through the inside of the nozzle 33, and the composite material 14 is taken out/injected from the tip 33*a* of the nozzle 33. As a result, the nozzle 33 solidifies the resin material 13 and forms the filament 11 in which the composite material 14 takes a form of threads. The magnet 34 is arranged around the nozzle 33. The magnet 34 forms a magnetic field inside the nozzle 33.

The method for producing the bond magnet 10 includes a melting step of the resin material 13, a magnetizing and aligning step of the magnetic powder 12, and an arrangement step of the filament 11.

In the melting step of the resin material 13, the heater 32 heats the composite material 14 of the resin material 13 and the magnetic powder 12 inside the container 31 shown in FIG. 11, so that the resin material 13 in the composite material 14 is melted. The composite material 14 in which the resin material 13 is melted is sent to the nozzle 33.

In the magnetizing and aligning step of the magnetic powder 12, the magnetic powder 12 is magnetized and the magnetic powder 12 is aligned. That is, in order to magnetize the magnetic powder 12 and to make/align the direction of the magnetic moment of each particle of the magnetic powder 12 in a predetermined angle with respect to the axial direction of the nozzle 33, the magnetic field is formed by the magnet 34 inside the nozzle 33 shown in FIG. 11. When the composite material 14 in which the resin material 13 is melted passes through the inside of the nozzle 33, the magnetic powder 12 is magnetized and the magnetic powder 12 (i.e., the magnetic moment thereof) is aligned.

In the present embodiment, the magnetic field for magnetizing the magnetic powder 12 is formed such that the direction of the magnetic moment of the magnetic powder 12 is aligned in a direction parallel to the axial direction of the nozzle 33, which is a traveling direction D4 of the composite material 14 that moves inside the nozzle 33 toward the tip 33*a* of the nozzle 33, aligned/magnetized as an N pole first and an S pole behind direction. Therefore, as the composite material 14 moves inside the nozzle 33 toward the tip 33*a* of the nozzle 33, the direction of the magnetic moment of the magnetic powder 12 in the composite material 14 is aligned as a direction parallel to the axial direction of the nozzle 33, and as a direction aligned/magnetized as an N pole first and an S pole behind with respect/reference to the traveling direction D4 of the composite material 14. When the Sm—Fe—N type magnetic powder was used, the magnetization of the magnetic powder before magnetization was OT, and the degree of alignment of the magnetic powder was 0%. The degree of alignment of the magnetic powder after magnetization was 90%.

Figure 12:
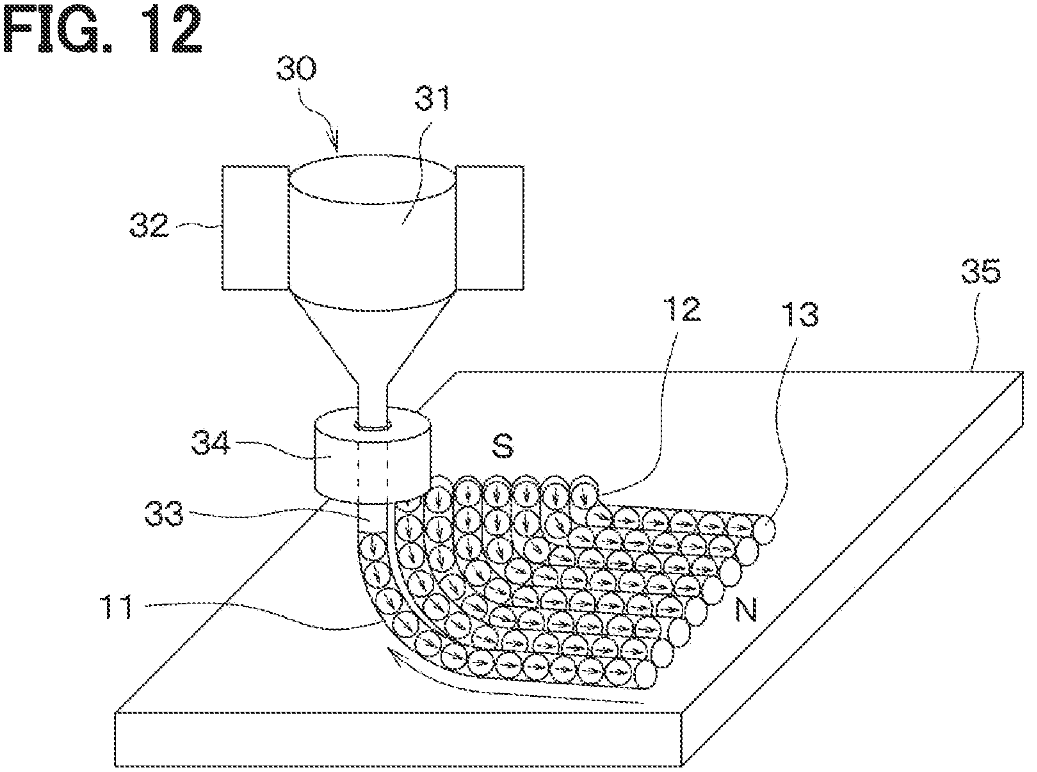
FIG. 12 is a diagram showing a state in which a plurality of filaments are arranged on a stage of a bond magnet manufacturing apparatus in the method for manufacturing a bond magnet in the first embodiment.

In the arranging step of the filament 11, as shown in FIG. 11, the composite material 14 is extruded from the tip 33*a* of the nozzle 33, so that the composite material 14 becomes filamentous and the filament 11 is formed. The composite material 14 comes out from the tip 33*a* of the nozzle 33 to the outside of the nozzle 33, and the resin material 13 is cooled, so that the resin material 13 is solidified in a state where the magnetic powder 12 is aligned in a specific direction. At such timing, as shown in FIG. 12, the filament 11 extruding from the nozzle 33 is arranged on the surface of a stage 35 so that the bond magnet 10 having the shape shown in FIGS. 3 and 4 is formed. An arrow shown next to the filament 11 in FIG. 12 indicates a moving direction of the nozzle 33 with respect to the stage 35. The filament 11 is arranged before the resin material 13 is completely solidified. By solidifying the resin material 13, adjacent filaments 11 are bonded to each other. As described above, in the arrangement step of the filament 11, the composite material 14 in which the magnetic powder 12 is aligned is taken out from the tip 33*a* of the nozzle 33 to form the filament 11 and the filament 11 is arranged. In the arrangement step of the filaments 11, a plurality of filaments 11 are arranged so that the first component 21 and the second component 22 are formed.

Figure 13:
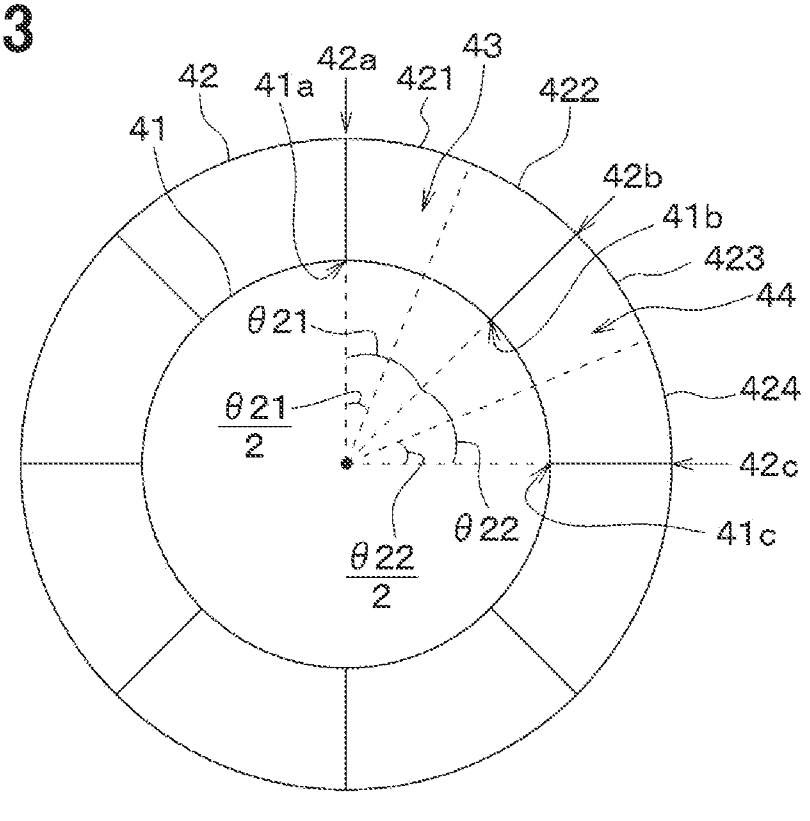
FIG. 13 is a diagram for explaining the arrangement of a plurality of filaments on a stage of a bond magnet manufacturing apparatus in the method for manufacturing a bond magnet in the first embodiment.

Here, the arrangement of the plurality of filaments 11 is more specifically described. As shown in FIG. 13, a double circle having an inner circle 41 and an outer circle 42 is assumed in a virtual plane. The outer circle 42 is located outside the inner circle 41. The position of the center of the outer circle 42 is the same as that of the inner circle 41. The radius of the inner circle 41 is the same as the radius of the inner peripheral surface of the target ring-shaped bond magnet 10. The radius of the outer circle 42 is the same as the radius of the outer peripheral surface of the target ring-shaped bond magnet 10.

First, the first component 21 is formed as follows. Of the outer circle 42 and the inner circle 41 shown in FIG. 13, the positions directly "above" the center are designated as positions 42*a* and 41*a* at 0 o'clock of the analog clock, respectively. The range from the 0 o'clock positions 42*a* and 41*a* of the outer circle 42 and the inner circle 41 to positions 42*b* and 41*b* at 1:30 is a planned formation region 43 of the first component 21. The positions 42*b* and 41*b* at 1:30 are the positions indicated by the hour hand at 1:30 on the analog clock.

The planned formation region 43 of the first component 21 includes two regions of the outer circle 42, that is, a first region 421 and a second region 422 respectively having ½ of the central angle θ21 of the first component 21, which may be defined as a counterclockwise-extending arc and a clockwise-extending arc from a center point between the positions 42*a* and 42*b*. That is, half of the arc from the 0 o'clock position 42*a* to the 1:30 position 42*b* of the outer circle 42 on the 0 o'clock side is the first region 421 of the outer circle 42, and half of the arc on the 1:30 side is the second region 422 of the outer circle 42. In the planned formation region 43 of the first component 21, a position on the first region 421 of the outer circle 42 is a drawing start position of the filament 11. A position on the second region 422 of the outer circle 42 is a drawing end position of the filament 11.

Figure 14:
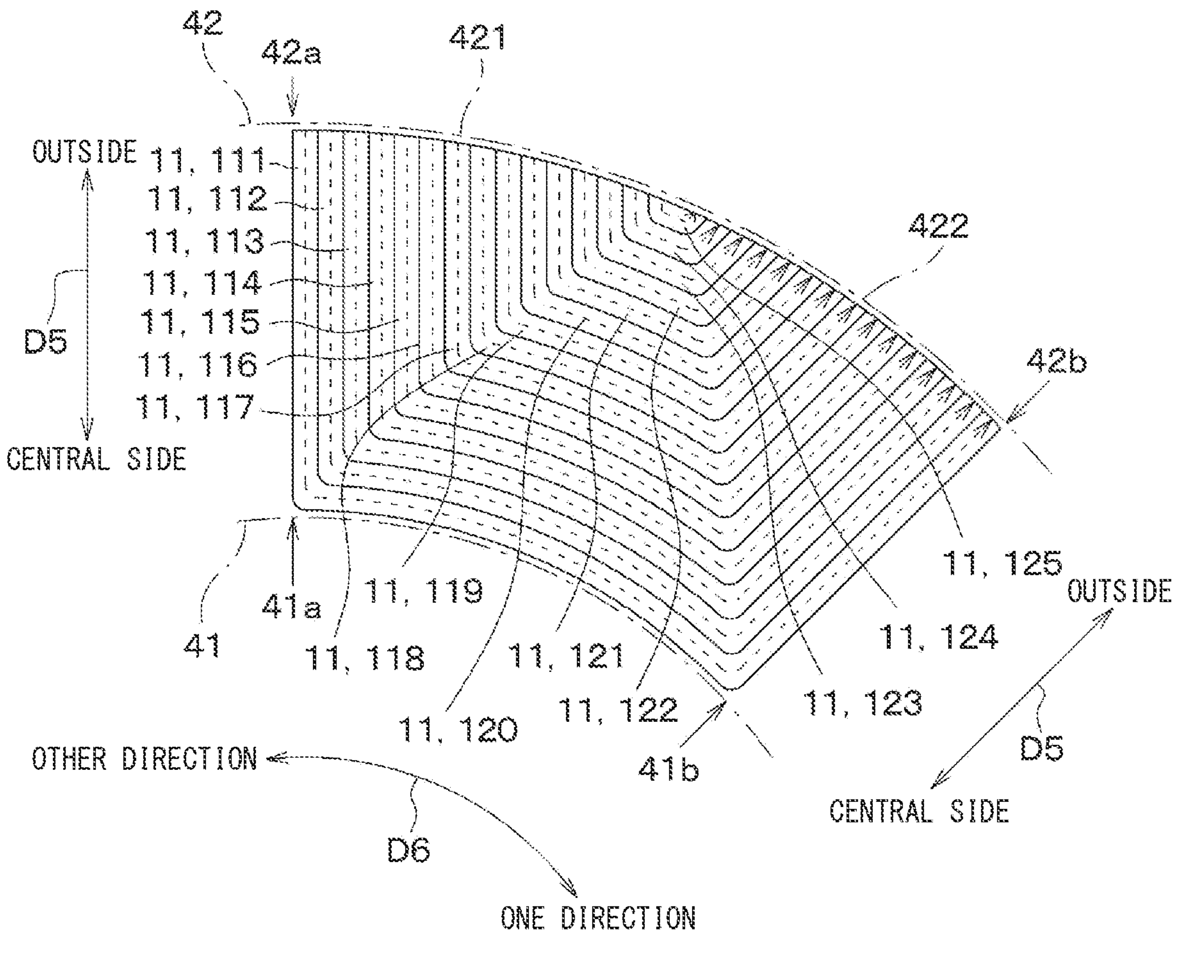
FIG. 14 is a diagram for explaining the arrangement of a plurality of filaments for forming the first component in the method for manufacturing a bond magnet in the first embodiment.

As shown in FIG. 14, a first filament 111 serving as the filament 11 is drawn in a U shape along the direction of a broken line arrow in FIG. 14. That is, the first filament 111 is drawn from the 0 o'clock position 42*a* of the outer circle 42 to the 0 o'clock position 41*a* of the inner circle 41 toward the center side of the outer circle 42 in a radial direction D5. Subsequently, the first filament 111 is further drawn clockwise from the position 41*a* of the inner circle 41 in the circumferential direction D6, to a position of a fan-shape arc of the inner circle 41 corresponding to the central angle θ21 of the first component 21. The position corresponding to a length of the fan-shaped arc at the central angle θ21 is the position 41*b* at 1:30 of the inner circle 41. Subsequently, the first filament 111 is further drawn toward the outside in the radial direction D5 up to the position 42*b* at 1:30 on the outer circle 42.

Next, a second filament 112 serving as the filament 11 is drawn in a U shape adjacent to the first filament 111 along a direction of the broken line arrow in FIG. 14. That is, the second filament 112 is drawn adjacent to the first filament 111, from a position clockwise adjacent to the 0 o'clock position 42*a* on the outer circle 42 toward the center side in the radial direction D5, and clockwise along one of the circumferential directions D6, and toward the outside in the radial direction D5.

Further, a third filament 113 serving as the filament 11 is drawn in a U shape adjacent to the second filament 112 along a direction of the broken line arrow in FIG. 14. That is, the third filament 113 is drawn adjacent to the second filament 112, from a position clockwise adjacent to the 0 o'clock position 42*a* on the outer circle 42 toward the center side in the radial direction D5, and clockwise along one of the circumferential directions D6, and toward the outside in the radial direction D5.

Similarly, each of a fourth filament 114 to a fifteenth filament 125 respectively serving as the filament 11 is drawn in a U shape adjacent to the previously drawn filament 11. In such manner, each of the plurality of filaments 11 is arranged in a U shape adjacent to each other, whereby the first component 21 shown in FIG. 10 is formed.

Subsequently, the second component 22 is formed as follows. Of the outer circle 42 and the inner circle 41 shown in FIG. 13, a planned formation region 44 of the second component 22 is defined as a range from the positions 42*b* and 41*b* at 1:30 to the positions 42*c* and 41*c* at 3:00, respectively. The planned formation region 44 of the second component 22 includes two regions of the outer circle 42, that is a third region 423 and a fourth region 424 respectively having ½ of the central angle θ22 of the second component 22, which may be defined as a counterclockwise-extending arc and a clockwise-extending arc from a center point between the positions 42*b* and 42*c*. That is, half of the arc from the position 42*b* at 1:30 to the position 42*c* at 3 o'clock of the outer circle 42 is, on the 1:30 side, the third region 423 of the outer circle 42, and, on the 3 o'clock side, the fourth region 424. In the planned formation region 44 of the second component 22, a position on the fourth region 424 of the outer circle 42 is a drawing start position of the filament 11. A position on the third region 423 of the outer circle 42 is a drawing end position of the filament 11.

Figure 15:
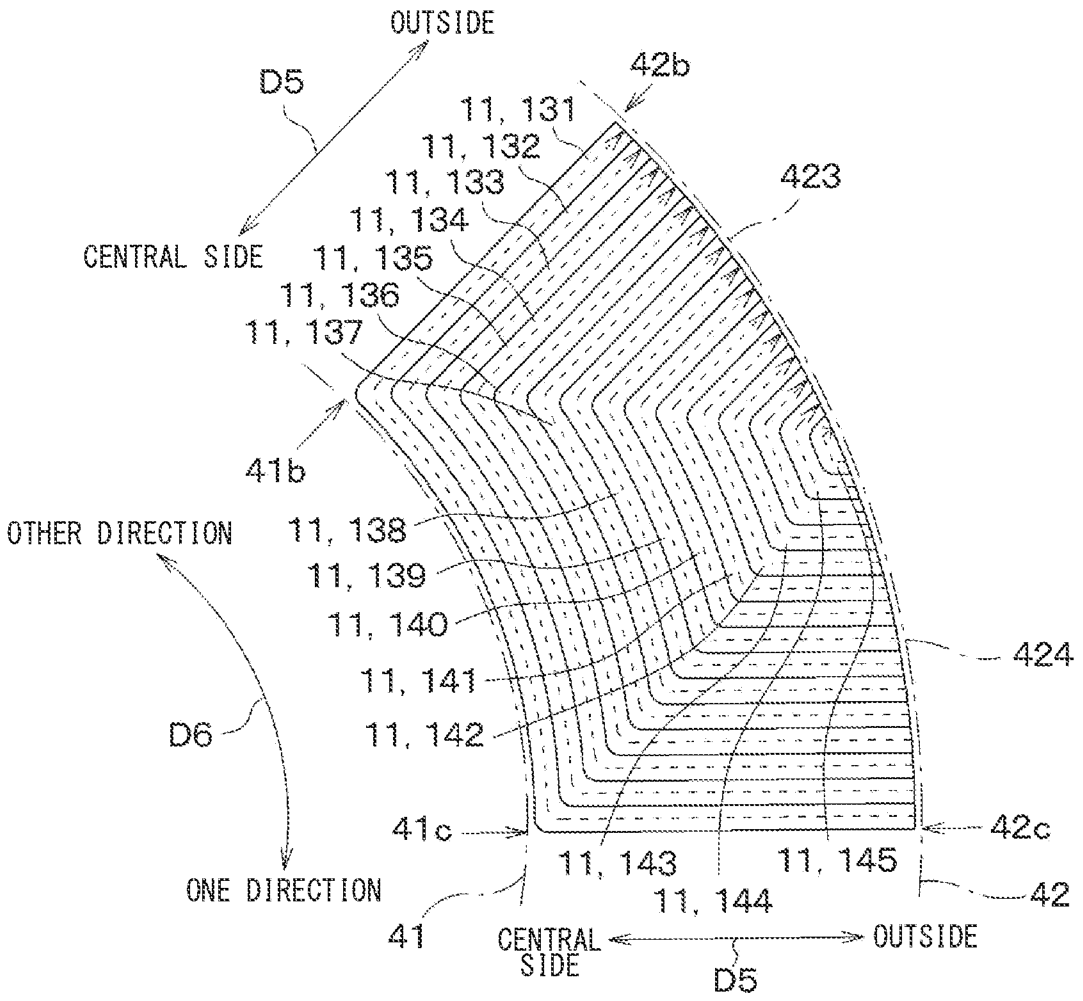
FIG. 15 is a diagram for explaining the arrangement of a plurality of filaments for forming a second component in the method for manufacturing a bond magnet in the first embodiment.

As shown in FIG. 15, a 21st filament 131 serving as the filament 11 is drawn in a U shape along the direction of a broken line arrow in FIG. 15. That is, the 21st filament 131 is drawn from the 3 o'clock position 42*c* of the outer circle 42 toward the center side in the radial direction D5, up to the 3 o'clock position 41*c* of the inner circle 41. Subsequently, the 21st filament 131 is further drawn counterclockwise from the 3 o'clock position 41*c* of the inner circle 41 in the circumferential direction D6, to a position of a fan-shape arc of the inner circle 41 corresponding to the central angle θ22 of the second component 22. The position corresponding to a length of the fan-shaped arc at the central angle θ22 is the position 41*b* at 1:30 of the inner circle 41. At such timing, the 21st filament 131 is brought adjacent to the 1st filament 111 of the 1st component 21. Subsequently, the 21st filament 131 is drawn toward the outside in the radial direction D5 up to the position 42*b* at 1:30 on the outer circle 42.

Next, a 22nd filament 132 serving as the filament 11 is drawn in a U shape adjacent to the 21st filament 131 along a direction of the broken line arrow in FIG. 15. That is, the 22nd filament 132 is drawn adjacent to the 21st filament 131, from a position counterclockwise adjacent to the 3 o'clock position of the outer circle 42 toward the center side in the radial direction D5, and counterclockwise along one of the circumferential directions D6, and toward the outside in the radial direction D5.

Further, a 23rd filament 133 serving as the filament 11 is drawn in a U shape adjacent to the 22nd filament 132 along a direction of the broken line arrow in FIG. 15. That is, the 23rd filament 133 is drawn adjacent to the 22nd filament 132, from a position counterclockwise adjacent to the 3 o'clock position 42*c* on the outer circle 42 toward the center side in the radial direction D5 with respect to the 3 o'clock position 42*c* of the outer circle 42, and counterclockwise along one of the circumferential directions D6, and toward the outside in the radial direction D5.

Similarly, each of a 24th filament 134 to a 35th filament 145 respectively serving as the filament 11 is drawn in a U shape adjacent to the previously drawn filament 11. In such manner, each of the plurality of filaments 11 is arranged in a U shape adjacent to each other, so that the second component 22 shown in FIG. 10 is formed.

In such manner, after one set of basic components 20 shown in FIG. 10 is formed, the other three sets of basic components 20 are also formed in the same manner. As shown in FIG. 3, one ring-shaped body 23 is formed by forming four sets of basic components 20 side by side in the circumferential direction so that adjacent basic components 20 are connected to each other.

Further, as shown in FIG. 4, a plurality of other ring-shaped bodies 23 having the same structure as the ring-shaped body 23 described above are laminated along the direction D1 parallel to the center line CL2 of the ring-shaped body 23, based on the first one of the ring-shaped body 23. At such timing, the phases of the magnetic poles existing on the outer peripheral surface 23*b* of the ring-shaped body 23 shown in FIG. 3 are respectively matched. That is, in each of the plurality of the laminated ring-shaped bodies 23, the positions of the four sets of basic components 20 in the circumferential direction are the same/matched. In such manner, the ring-shaped bond magnet 10 is manufactured.

Figure 16:
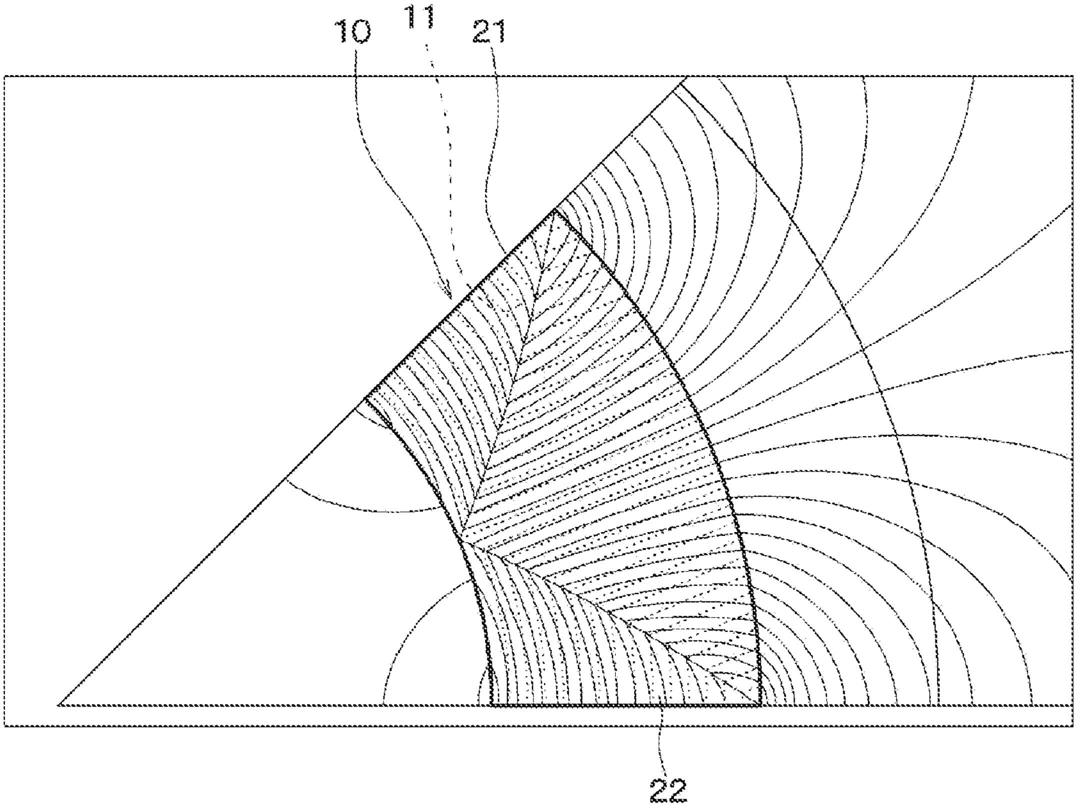
FIG. 16 is a simulation result of the magnetic flux of the bond magnet in the first embodiment.

Next, the magnetic flux of the bond magnet 10 of the present embodiment is described. FIG. 16 is a simulation result using a simulation software "JMAG-Designer" for visualization of the magnetic flux of the bond magnet 10 of the present embodiment. In the bond magnet regarding the simulation, the magnetic powder constituting the bond magnet is Sm—Fe—N. The resin material that constitutes the bond magnet is polycaprolactone. The ratio of magnetic powder to resin material is magnetic powder:resin material=60 vol %:40 vol %.

FIG. 16 shows a part of the bond magnet 10 of the present embodiment, and a magnetic flux line is shown by a solid line between the inside and the outside of the part. The central angle of the part is 45 degrees. The part includes half of the first component 21 and half of the second component 22 of one set of basic components 20. In FIG. 16, the plurality of filaments 11 are indicated by broken lines.

As shown in FIG. 16, the magnetic flux line inside the bond magnet 10 extends and spreads in a direction along the center line of each of the plurality of filaments 11. From such an observation, the direction of the magnetic flux inside the bond magnet 10 is a direction along the center line of each of the plurality of filaments 11. The direction along the center line is a direction parallel to or substantially parallel to the center line.

Inside the bond magnet 10, the magnetic flux lines extend in the radial direction or a direction close to the radial direction toward the outer peripheral surface, and the directions of the magnetic fluxes are aligned with each other. Then, a magnetic flux line is emitted/projected from the outer peripheral surface toward the outside of the bond magnet 10. The surface magnetic flux density of the outer peripheral surface of the bond magnet 10 was 0.37 T on average.

As described above, the bond magnet 10 of the present embodiment includes a plurality of filaments 11 that are bonded to each other to form the shape of the bond magnet 10. Each of the plurality of filaments 11 has magnetic anisotropy. Specifically, the direction of the magnetic moment of the magnetic powder 12, which is the sum of the magnetic moments of each particle of the magnetic powder 12 at each portion along the center line CL1 of the filament 11, is a direction at (i.e., set to have) a predetermined angle from the center line CL1 of the filament 11 at the position of the magnetic powder 12 in a portion of the filament 11 having such a magnetic powder 12.

Further, the bond magnet 10 of the present embodiment is manufactured by the method of manufacturing the bond magnet 10 of the present embodiment. The method for manufacturing the bond magnet 10 of the present embodiment includes melting the resin material 13, aligning the magnetic powder 12, and arranging the filament 11. In melting the resin material 13, the composite material 14 containing the resin material 13 and the magnetic powder 12 is heated. In aligning the magnetic powder 12, the composite material 14 in which the resin material 13 is melted is passed through the inside of the nozzle 33 in which the magnetic field is formed to magnetize the magnetic powder 12 and align the magnetic direction of the magnetic powder 12. In arranging the filament 11, the composite material 14 in which the magnetic powder 12 is aligned is taken out from the tip 33*a* of the nozzle 33 to form the filament 11 and the filament 11 is arranged. In arranging the filaments 11, a plurality of filaments 11 are arranged so that a bond magnet 10 having a predetermined shape is formed.

According to the above, the direction of the magnetic flux inside the bond magnet 10 is determined by the arrangement of the plurality of filaments 11. The degree of freedom in arranging the plurality of filaments 11 is higher than the degree of freedom in the direction of the magnetic field lines of the magnetic field formed in the internal space of the mold. Therefore, the degree of freedom in the direction of the magnetic flux inside the bond magnet 10 can be increased as compared with the case where the bond magnet is manufactured by resin molding using a mold.

Further, according to the above, a plurality of filaments 11 are arranged so that the directions of the magnetic fluxes inside the bond magnet 10 are aligned in the target direction. As a result, the bond magnet 10 in which the directions of the magnetic fluxes generated therein are aligned in the target direction can be made.

Further, according to the present embodiment, the following effects are achievable.

(1) As shown in FIG. 7, in each of the plurality of filaments 11, the surface layer portion 11*a* of one filament 11 has a greater ratio of the resin material to the magnetic powder, compared with the portion 11*b* of the one/same filament 11 on the central side of the surface layer portion 11*a*. According to such observation, a greater amount of resin material is contained in the surface layer portion 11*a* of the filament 11. Each of the plurality of filaments 11 is bonded by bonding the resin materials of the surface layer portion 11*a* of the filament 11. Therefore, the more the resin material contained in the surface layer portion 11*a* of the filament 11, the stronger the bond between the filaments 11, and the easier it is to maintain the shape of the bond magnet 10.

(2) The bond magnet 10 includes a plurality of sets of basic components 20 in which the first component 21 and the second component 22 are provided as one set of basic components 20. Each of the plurality of sets of basic components 20 forms one ring-shaped body 23 by arranging and connecting to each other in the circumferential direction D2 with respect to the center line CL2. In each of the plurality of sets of basic components 20, the second component 22 is adjacent to one side in the circumferential direction with respect to the first component 21. Each of the first component 21 and the second component 22 is composed of at least a plurality of filaments 11 bonded to each other.

The one end 11*c* and the other end 11*d* of each of the plurality of first filaments 11 of the first component 21 are located on the outer peripheral surface 23*b* of the ring-shaped body 23. Each of the plurality of filaments 11 of the first component 21 extends and spreads along the radial direction D3 from the one end 11*c* toward the inner peripheral surface 23*a*, and changes its direction toward one of the circumferential directions D2 to further extend and spread, and further changes its direction to extend and spread along the radial direction D3 toward the other end 11*d*. The arrangement of the plurality of filaments 11 of the second component 22 is the same as that of the first component 21.

In each of the plurality of filaments 11 of the first component 21, the direction of the magnetic moment of the magnetic powder 12 at each portion along the center line of the filament 11 is a direction along the center line of the filament 11 and a direction in which the magnetic pole on the one end 11*c* is the N pole and the magnetic pole on the other end 11*d* is the S pole. On the other hand, in each of the plurality of filaments 11 of the second component 22, the direction of the magnetic moment of the magnetic powder 12 at each portion along the center line of the filament 11 is a direction along the center line of the filament 11 and a direction in which the magnetic pole on the one end 11*c* is the S pole and the magnetic pole on the other end 11*d* is the N pole.

The magnet used for the inner rotor 3 of the motor 1 is required to have a high surface magnetic flux density on the outer peripheral surface which is the working surface. Here, the bond magnet 10 of the present embodiment is compared with bond magnets J1 and J2 of Comparative Examples 1 and 2.

Figure 17:
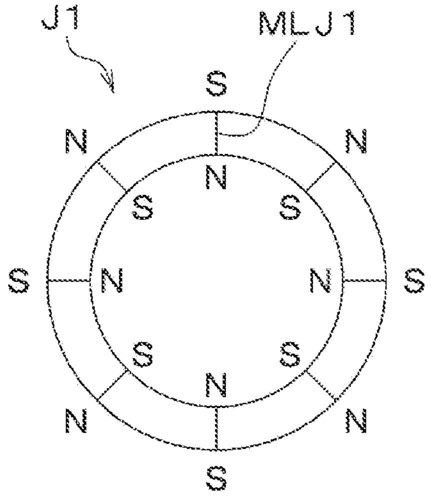
FIG. 17 is a plan view of the bond magnet of a comparative example 1, and is a diagram schematically showing a magnetic flux in the bond magnet.

The bond magnet J1 of the Comparative Example 1 shown in FIG. 17 is a hollow ring-shape magnet. A typical magnetic flux line MLJ1 is shown inside the bond magnet J1 in FIG. 17. In the bond magnet of Comparative Example 1, J1 has magnetic poles on both of the outer peripheral surface and the inner peripheral surface. The magnetic flux inside the bond magnet J1 extends and spreads in the radial direction between the inner peripheral surface and the outer peripheral surface as shown by the magnetic flux line MLJ1 in FIG. 17. Not only does the magnetic flux extend outward from the outer peripheral surface, but the magnetic flux also extends and spreads from the inner peripheral surface, which is not the working surface. Therefore, in the bond magnet J1 of Comparative Example 1, the magnetic flux that can be used on the outer peripheral surface is halved. Therefore, in the bond magnet J1 of Comparative Example 1, the surface magnetic flux density on the outer peripheral surface is low.

Figure 18:
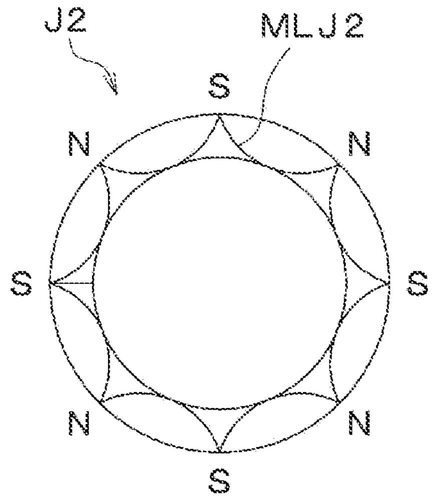
FIG. 18 is a plan view of the bond magnet of a comparative example 2, and is a diagram schematically showing a magnetic flux in the bond magnet.

The bond magnet J2 of Comparative Example 2 shown in FIG. 18 is a hollow ring-shape magnet. A typical magnetic flux line MLJ2 is shown inside the bond magnet J2 in FIG. 18. In the bond magnet J2 of Comparative Example 2, a magnetic flux is formed inside the bond magnet J2 so that magnetic poles are mainly generated on the outer peripheral surface. Inside the bond magnet J2, as shown by the magnetic flux line MLJ2 in FIG. 18, the magnetic flux extends from a part of the outer peripheral surface toward the other part of the outer peripheral surface in an arc shape convex toward the center. That is, inside the bond magnet J2, the magnetic flux extends and spreads obliquely in the radial direction toward the outer peripheral surface. Therefore, the radial component of the magnetic flux extending from the outer peripheral surface to the outside is small. Therefore, in the bond magnet J2 of Comparative Example 2, the surface magnetic flux density on the outer peripheral surface is low.

Figure 19:
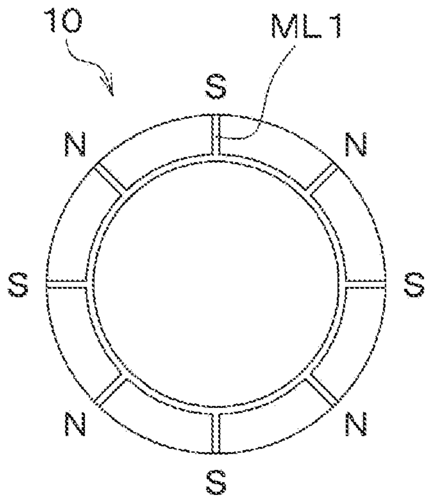
FIG. 19 is a plan view of the bond magnet of the first embodiment, and is a diagram schematically showing a magnetic flux in the bond magnet.

The bond magnet shown in FIG. 19 is the bond magnet 10 of the present embodiment. A typical magnetic flux line ML1 is shown inside the bond magnet 10 of FIG. 19. As shown in FIG. 19, in the bond magnet 10 of the present embodiment, magnetic flux is formed so that magnetic poles are mainly generated on the outer peripheral surface. Inside the bond magnet 10, the magnetic flux extends along the radial direction or a direction close to the radial direction toward the outer peripheral surface, as shown by the magnetic flux line ML1 in FIG. 19. Therefore, the radial component of the magnetic flux extending from the outer peripheral surface to the outside is large. Therefore, according to the bond magnet 10 of the present embodiment, the surface magnetic flux density of the outer peripheral surface can be increased as compared with the bond magnets J1 and J2 of Comparative Examples 1 and 2.

Figure 20:
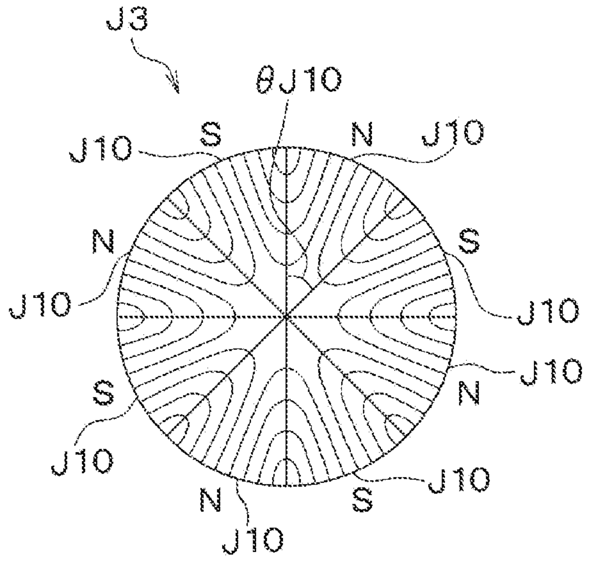
FIG. 20 is a plan view of the bond magnet of a comparative example 3 and schematically shows the magnetic flux in the bond magnet.
Figure 21:
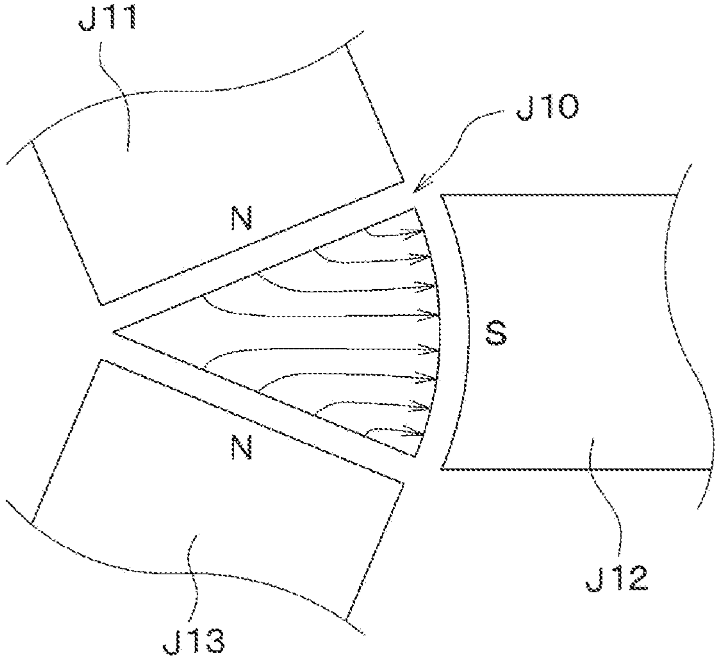
FIG. 21 is a diagram showing a part of a manufacturing process of the bond magnet of the comparative example 3.

Next, the bond magnet 10 of the present embodiment is compared with the bond magnet J3 of Comparative Example 3 shown in FIG. 20. The bond magnet J3 of Comparative Example 3 corresponds to the bond magnet described in Patent Document 1, Japanese Patent No. 6536289 B2, corresponding to United States Patent Publications 2016/0093426 A1, 2017/0125164 A1, and 2021/0104361 A1. The bond magnet J3 has a solid (i.e., non-hollow) cylindrical/column shape. The bond magnet J3 is manufactured by joining a plurality of magnet pieces J10 having a shape obtained by dividing a cylindrical shape into a plurality of pieces in the circumferential direction. As shown in FIG. 21, each of the plurality of magnet pieces J10 is molded by the mold in a state where a magnetic field is formed in the internal space of the mold by the magnetizing magnets J11, J12, and J13.

Figure 22:
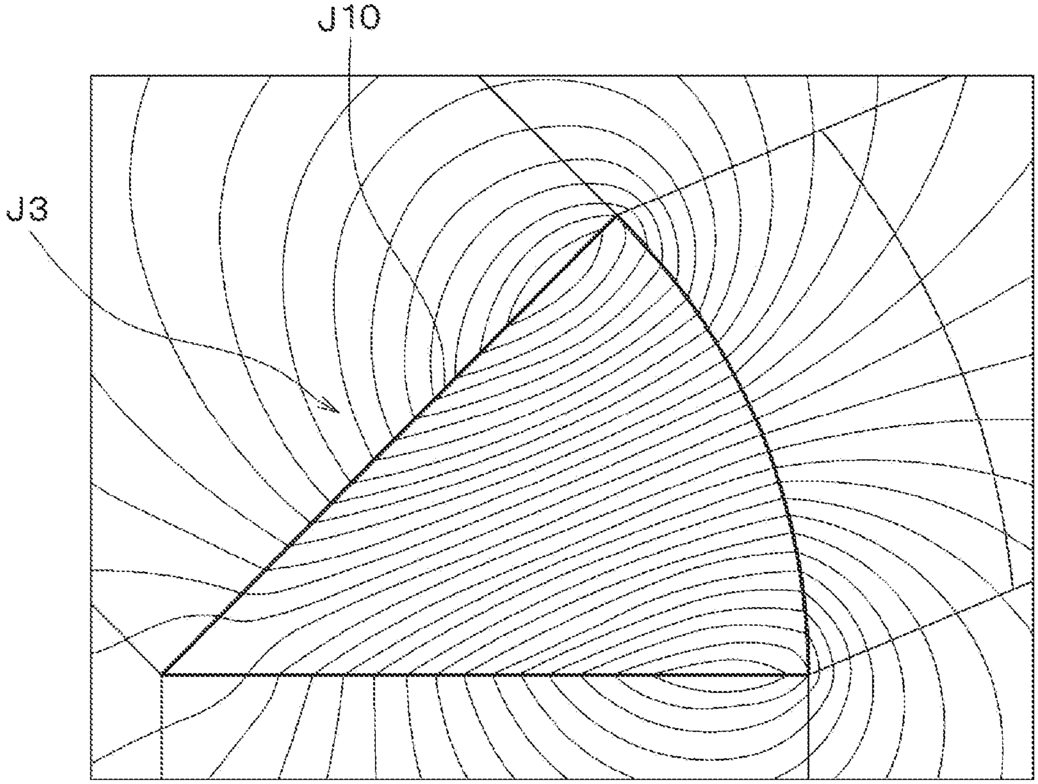
FIG. 22 is a simulation result of the magnetic flux of the bond magnet of the comparative example 3.

FIG. 22 is a simulation result using the simulation software "JMAG-Designer" for illustrating the magnetic flux of one magnet piece J10 in the bond magnet J3 of Comparative Example 3. A central angle θJ10 shown in FIG. 20 of one magnet piece J10 is 45 degrees. In the simulation described above, the respective material names of the magnetic powder and the resin material and the ratio of the magnetic powder and the resin material are the same as in the simulation of the bond magnet 10 of the present embodiment described above. According to such a simulation result, in the bond magnet J3 of Comparative Example 3, the surface magnetic flux density of the outer peripheral surface was 0.30 T on average. In the bond magnet 10 of the present embodiment, the surface magnetic flux density of the outer peripheral surface was 0.37 T on average. From these facts, it was confirmed that the bond magnet 10 of the present embodiment has a higher surface magnetic flux density than the bond magnet J3 of Comparative Example 3.

(3) In the bond magnet 10 of the present embodiment, A1/B1 shown in FIG. 10 is 1.

Figure 23:
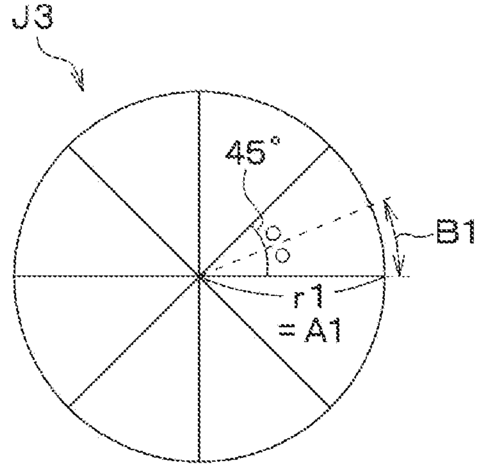
FIG. 23 is a plan view of the bond magnet of the comparative example 3, showing the radial length of the bond magnet and the length of a part of the arc of the bond magnet.

In the bond magnet J3 of Comparative Example 3, A1/B1 is 2.8. As shown in FIG. 23, A1 is the radial length of the bond magnet J3 and is equal to a radius r1 of the (outer) circular surface of the bond magnet J3. B1 is the length of a fan-shaped arc having a central angle of 22.5 degrees, having the same radius as the radius r1 of the outer peripheral surface of the bond magnet J3.

Patent Document 1 describes that when the central angle θJ10 of the magnet piece J10 is 45 degrees, the ratio of the radial length A1 to the arc length B1 is preferably larger than 2. Therefore, in the method for manufacturing a bond magnet described in Patent Document 1, it is difficult to manufacture a bond magnet having an annular shape in which A1/B1 is smaller than 2 and having a high surface magnetic flux density on the outer peripheral surface.

On the other hand, in the method for manufacturing the bond magnet 10 of the present embodiment, the bond magnet 10 is manufactured by arranging the magnetized filament 11. Therefore, according to the present embodiment, a bond magnet having a ring shape in which A1/B1 is smaller than 2 and having a high surface magnetic flux density on the outer peripheral surface is obtainable.

Note that, in the bond magnet 10 of the present embodiment, A1/B1 is 1. However, as in bond magnets 10A and 10B shown in FIGS. 24 and 25, A1/B1 may have a value other than 1 that is greater than 0 and less than 2. In the ring-shaped bond magnet 10A shown in FIG. 24, the length A1 in the radial direction is ½ of the radius r1 of the outer peripheral surface of the ring-shaped body. A1/B1 is 1.4. In the ring-shaped bond magnet 10B shown in FIG. 25, the length A1 in the radial direction is ¼ of the radius r1 of the outer peripheral surface of the ring-shaped body. A1/B1 is 0.7.

In the ring-shaped bond magnet in which A1/B1<1.0, in one filament 11 extending and spreading in a U shape, the thickness/diameter of the (string-shaped) portion extending and spreading in the radial direction is made greater than the thickness of the portion extending and expanding in the circumferential direction. As a result, it is possible to realize a ring shape in which A1/B1<1.0. In such manner, by making the thickness/string-shape diameter of the filament 11 different depending on the portion of the filament 11, the degree of freedom in the shape of the bond magnet composed of the plurality of filaments 11 can be increased.

Second Embodiment

Figure 26:
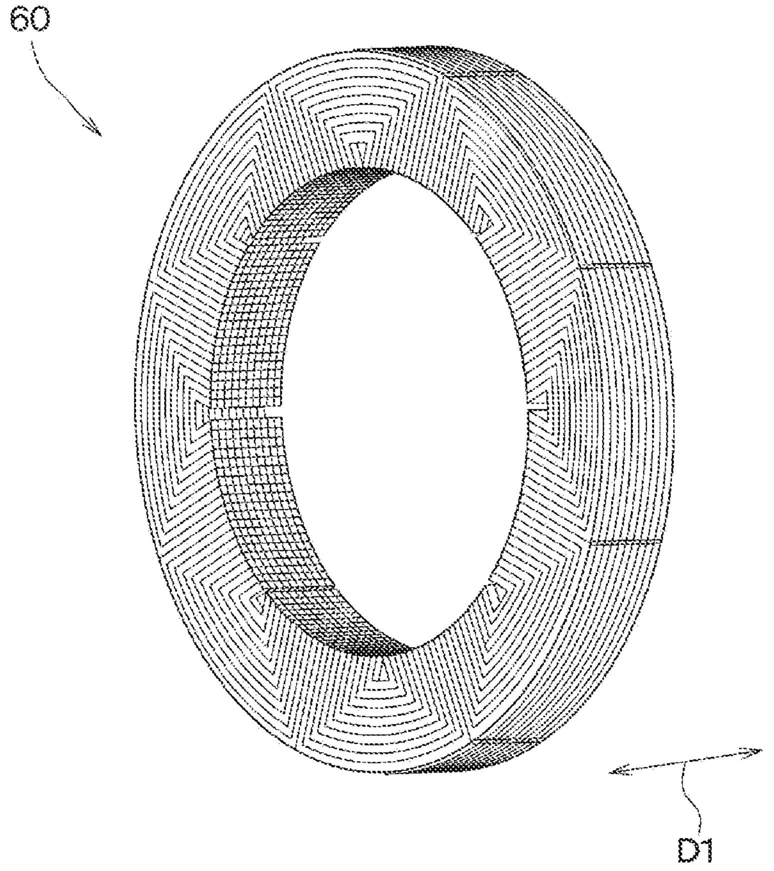
FIG. 26 is a perspective view of a bond magnet according to a second embodiment.
Figure 27:
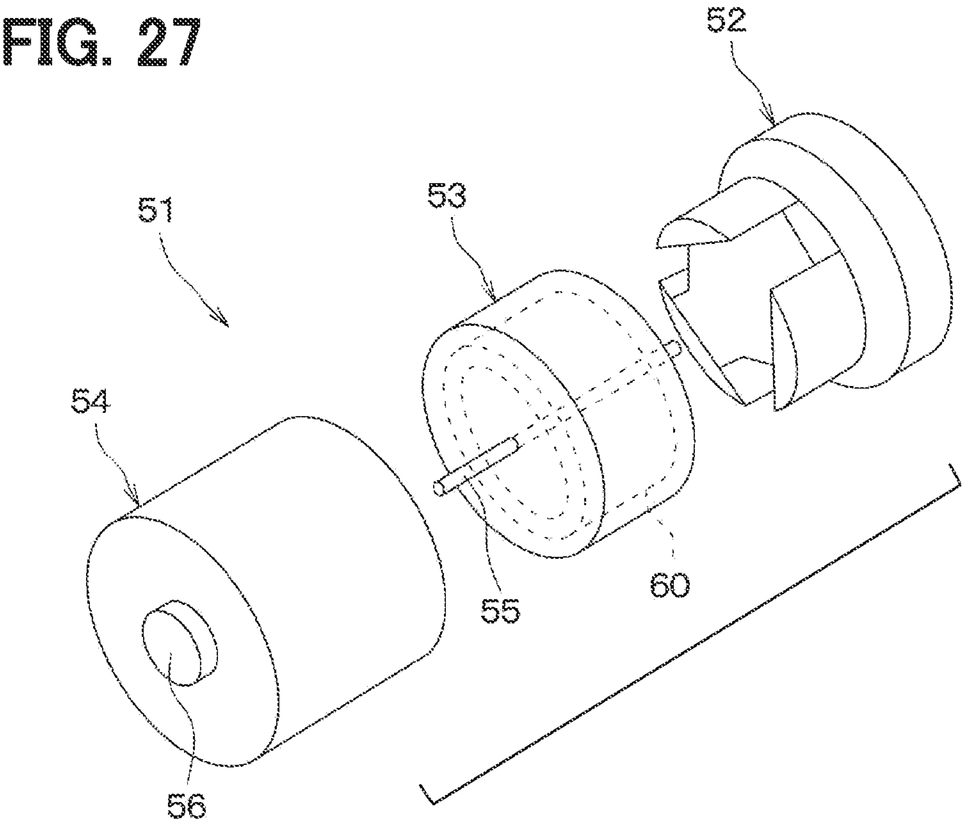
FIG. 27 is an exploded perspective view of a motor using the bond magnet of FIG. 26.

The bond magnet 60 of the present embodiment shown in FIG. 26 is used for an outer rotor 53 of an outer rotor type motor 51 shown in FIG. 27. A bond magnet 60 has a hollow ring shape as in the first embodiment.

The motor 51 shown in FIG. 27 is a permanent magnet synchronous motor. The motor 51 includes a stator 52, an outer rotor 53, and a housing 54.

Although not shown, the stator 52 includes an iron core and windings. The stator 52 generates a magnetic force that rotates the outer rotor 53. The outer rotor 53 is a rotating body arranged outside the stator 52. The outer rotor 53 includes a rotating shaft 55 and the bond magnet 60.

Figure 28:
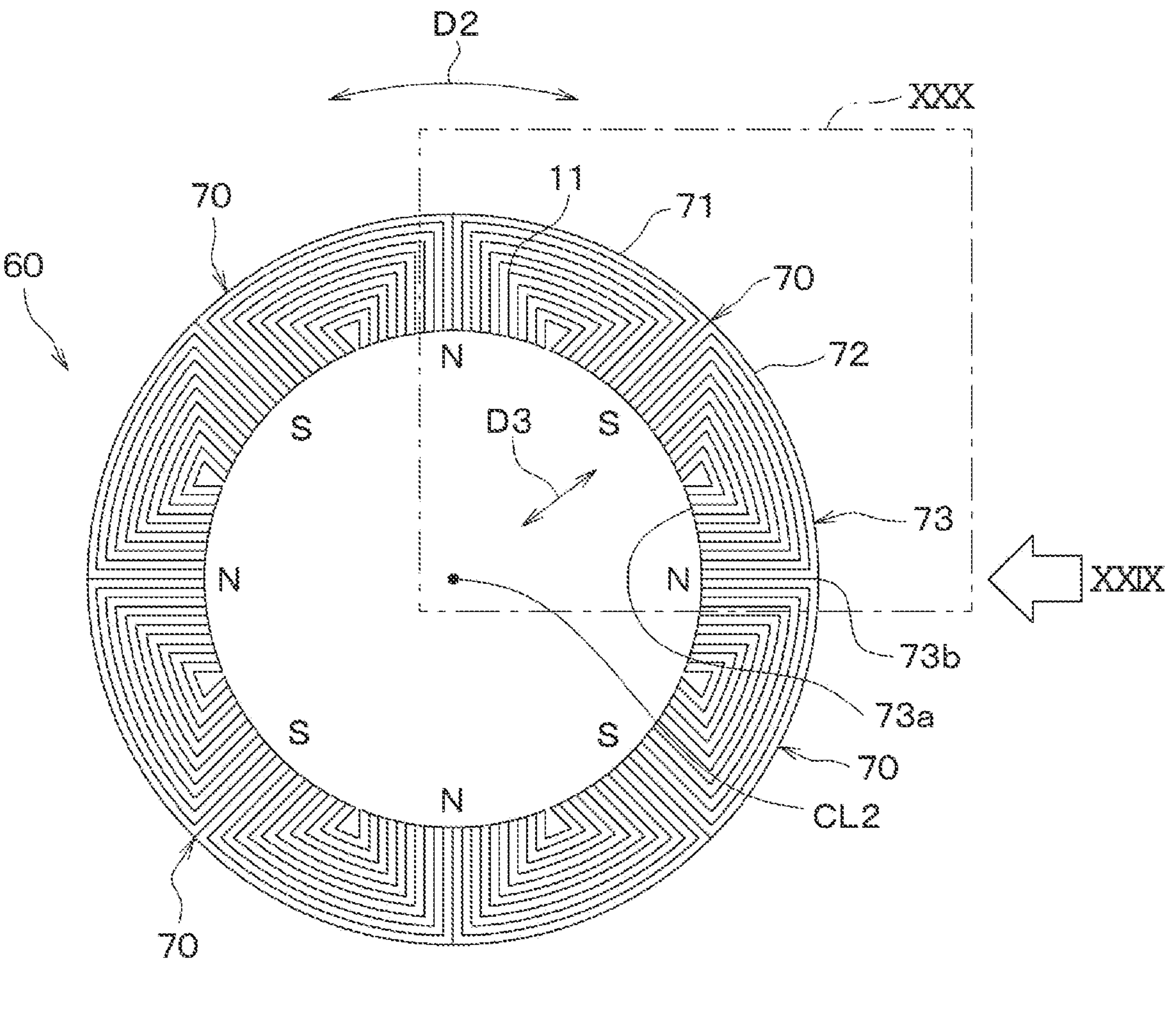
FIG. 28 is a plan view of the bond magnet of FIG. 26.

When the outer rotor 53 is arranged outside the stator 52, the inner peripheral surface of the bond magnet 60 faces the winding of the stator 52. As shown in FIG. 28, there are 8 magnetic poles on the inner peripheral surface of the bond magnet 60. The housing 54 accommodates the stator 52 and the outer rotor 53. The housing 54 has a bearing 56 that rotatably supports the rotating shaft 55.

Figure 29:
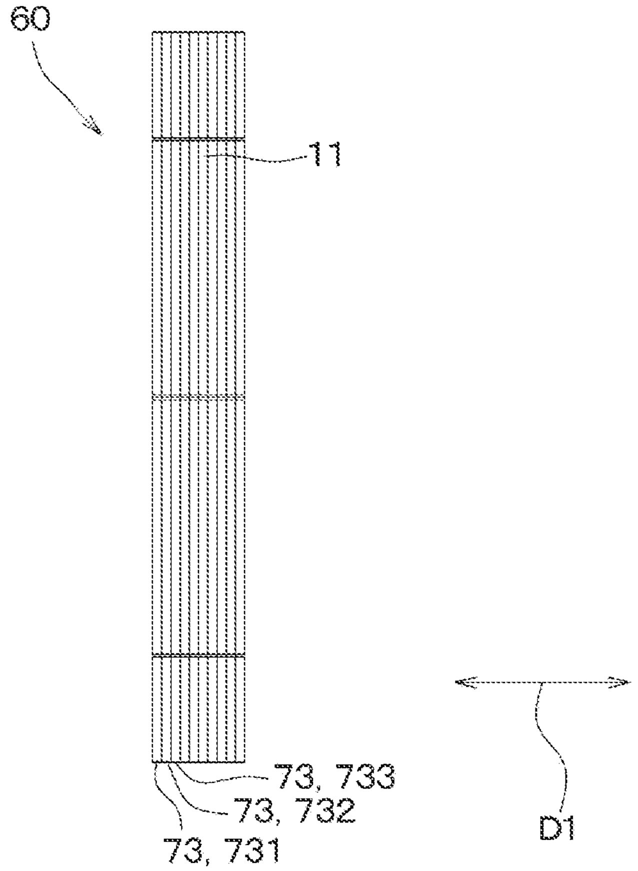
FIG. 29 is an XXIX arrow view of the bond magnet of FIG. 28.

As shown in FIGS. 28 and 29, the bond magnet 60 is composed of an aggregate of a plurality of filaments 11. In other words, the bond magnet 60 includes a plurality of filaments 11 that are bonded to each other to form the shape of the bond magnet 60. In the bond magnet 60 of the present embodiment, the arrangement of the plurality of filaments 11 is different from that of the bond magnet 10 of the first embodiment.

Figure 30:
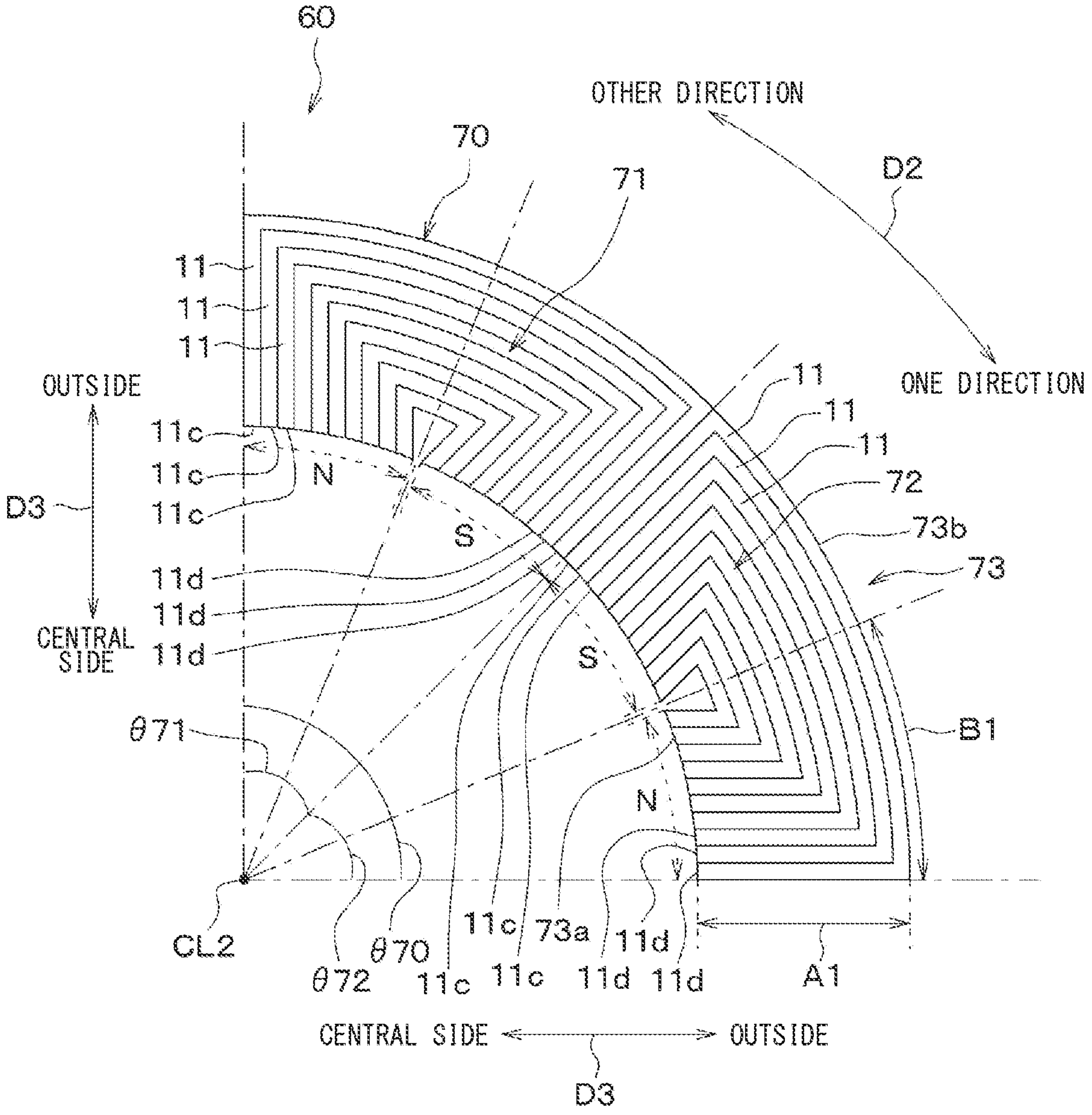
FIG. 30 is an enlarged view of the XXX portion of the bond magnet of FIG. 28.

As shown in FIG. 28, the bond magnet 60 includes a plurality of sets of basic components 70 in which a first component 71 and a second component 72 are provided as one set of basic components 70. FIG. 30 shows one set of basic components 70 in (i.e., picked up from) FIG. 28. As shown in FIG. 28, each of the plurality of sets of basic components 70 is connected to each other side by side in the circumferential direction D2 with respect to the center line CL2. As a result, the plurality of sets of basic components 70 form one ring-shaped body 73. The ring-shaped body 73 has an inner peripheral surface 73*a* located on the center side of the ring-shaped body 73 in the radial direction D3 with respect to the center line CL2 and an outer peripheral surface 73*b* of the ring-shaped body 73 located outside thereof in the radial direction D3. As shown in FIG. 29, the bond magnet 60 is composed of a laminated body in which a plurality of ring-shaped bodies 73 are laminated along the direction D1 parallel to the center line CL2.

As shown in FIG. 30, one set of basic components 70 corresponds to one obtained by dividing the ring-shaped body 73 into every predetermined central angles θ70 along the circumferential direction D2. In each of the plurality of sets of basic components 70, the second component 72 is adjacent to one side in the circumferential direction D2 with respect to the first component 71. In the present embodiment, one side/one direction among the circumferential directions D2 (two heads arrow) is a clockwise direction of the circumferential direction D2. The other side/other direction of the circumferential directions D2 is a counterclockwise direction of the circumferential direction D2. The first component 71 and the second component 72 correspond to one and the other (i.e., two) of one set of basic components 70 divided equally in the circumferential direction D2. Central angles θ71 and θ72 of the first component 71 and the second component 72, respectively, are ½ of the central angle θ70 of the basic component 70. In the present embodiment, the bond magnet 60 includes four sets of basic components 70. The central angle θ70 of one set of basic components 70 is 90 degrees. The central angles θ71 and 72 of the first component 71 and the second component 72 are 45 degrees, respectively.

Further, the width of the ring-shaped body 73 in the radial direction D3 is defined as A1 (as shown in FIG. 30). Let B1 be the length of a sector arc having a radius equal to the radius of the outer peripheral surface 73*b* and a central angle of 22.5 degrees. In such configuration, A1/B1=1.0.

Further, in one set of basic components 70, a region of one half of the inner peripheral surface of the first component 71 on the other side (i.e., on a second component 72 side) in the circumferential direction D2 is the N pole. A region of one half of the inner peripheral surface of the first component 71 on one side (i.e., on an away/far side with respect to the second component 72) in the circumferential direction D2 is the S pole.

The first component 71 is composed of at least a plurality of filaments 11 bonded to each other. The plurality of first filaments 11 are arranged adjacent to each other.

The one end 11*c* of each of the plurality of first filaments 11 of the first component 71 is located on the inner peripheral surface 73*a* of the ring-shaped body 73. The other end 11*d* of each of the plurality of first filaments 11 of the first component 71 is located on one side (i.e., on a second component 72 side) of the inner peripheral surface 73*a* of the ring-shaped body 73 with respect to one end 11*c* in the circumferential direction D2.

Each of the plurality of filaments 11 of the first component 71 extends in a U shape from the one end 11*c* to the other end 11*d*. More specifically, each of the plurality of filaments 11 of the first component 71 extends and spreads along the radial direction D3 from the one end 11*c* toward the outer peripheral surface 73*b*, and changes its direction to extend and spread in one of the circumferential directions D2, and further changes its direction toward the other end 11*d* to extend and spread along the radial direction D3. The portions of the plurality of filaments 11 of the first component 71 extending in the circumferential direction D2 are arranged (side by side) in the radial direction D3.

As described in FIG. 8, in each of the plurality of filaments 11 of the first component 71, the direction of the magnetic moment of the magnetic powder 12 at each portion along the center line CL1 of the filament 11 is a direction along the center line CL1 of the filament 11. The magnetic pole on the one end 11*c* is the N pole, and the magnetic pole on the other end 11*d* is the S pole.

Like the first component 71, the second component 72 is composed of at least a plurality of filaments 11 bonded to each other. The arrangement of the plurality of filaments 11 of the second component 72 is the same as that of the first component 71.

As described in FIG. 8, in each of the plurality of filaments 11 of the second component 72, the direction of the magnetic moment of the magnetic powder 12 at each portion along the center line CL1 of the filament 11 is a direction along the center line CL1 of the filament 11. The magnetic pole on the one end 11*c* is the S pole, and the magnetic pole on the other end 11*d* is the N pole. As described above, the direction of the magnetic moment of the magnetic powder 12 in the plurality of filaments 11 of the second component 72 is opposite to the direction of the magnetic moment of the magnetic powder 12 in the plurality of filaments 11 of the first component 71.

As shown in FIG. 29, in the bond magnet 60 of the present embodiment, a plurality of ring-shaped bodies 73 are laminated. That is, one of the above-mentioned ring-shaped bodies 73 is a first ring-shaped body 731. A second ring-shaped body 732 having the same structure as the first ring-shaped body 731 is laminated with respect to (i.e., stacked/layered on top of) the first ring-shaped body 731 in the direction D1, which is in parallel with the center line CL2 of the first ring-shaped body 731. Further, another ring-shaped body 733 having the same structure as the first ring-shaped body 731 is laminated/stacked in the direction D1 parallel to the center line CL2 of the first ring-shaped body 731 with respect to the second ring-shaped body 732.

Note that the bond magnet 60 of the present embodiment is composed of a laminated body of a plurality of ring-shaped bodies 73. However, the bond magnet 60 may also be composed of only one ring-shaped body 73.

Next, a method of manufacturing the bond magnet 60 of the present embodiment is described. The method for manufacturing the bond magnet 60 of the present embodiment is the same as the method for manufacturing the bond magnet 10 of the first embodiment except for the arrangement step of the filament 11. In the arrangement step of the filaments 11, a plurality of filaments 11 are arranged so that the first component 71 and the second component 72 are formed.

Figure 31:
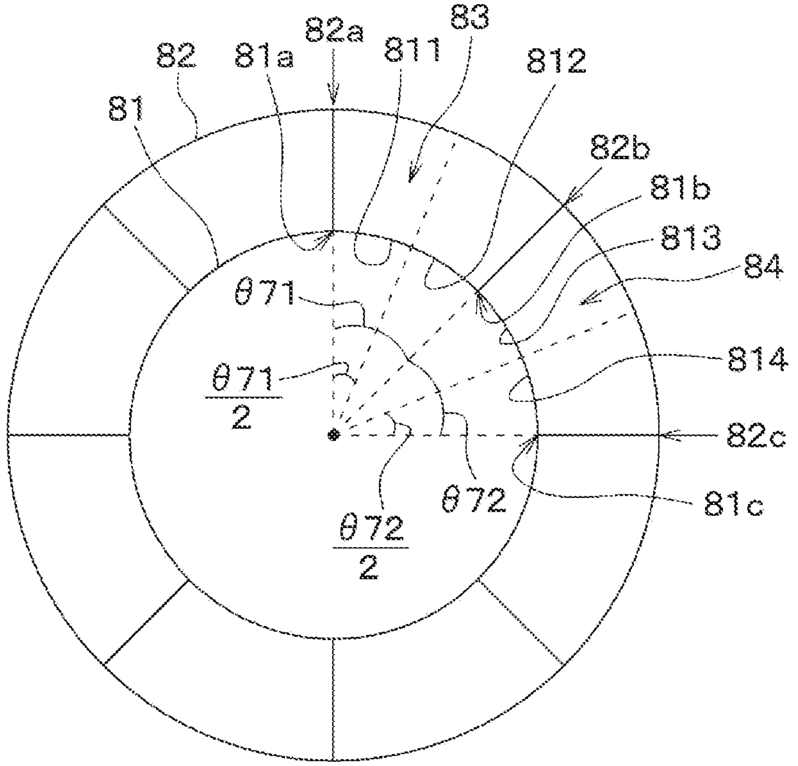
FIG. 31 is a diagram for explaining the arrangement of a plurality of filaments on a stage of a bond magnet manufacturing apparatus in the method for manufacturing a bond magnet in the second embodiment.

The arrangement of the plurality of filaments 11 in the present embodiment is specifically described. As shown in FIG. 31, a double circle having an inner circle 81 and an outer circle 82 is assumed on a virtual plane. The outer circle 82 is located outside the inner circle 81. The position of the center of the outer circle 82 is the same as that of the inner circle 81. The radius of the inner circle 81 is the same as the radius of the inner peripheral surface of the target ring-shaped bond magnet 60. The radius of the outer circle 82 is the same as the radius of the outer peripheral surface of the target ring-shaped bond magnet 60.

First, the first component 71 is formed as follows. Of the outer circle 82 and the inner circle 81 shown in FIG. 31, the positions directly above the center are positions 82*a* and 81*a* at 0 o'clock of the analog clock, respectively. The range from the 0 o'clock positions 82*a* and 81*a* of the outer circle 82 and the inner circle 81 to the positions 82*b* and 81*b* at 1:30 defines a planned formation region 83 of the first component 71.

In the planned formation region 83 of the first component 71, the two arcs of the inner circle 81 whose central angle is ½ of the angle of the central angle θ71 of the first component 71 are designated as a first region 811 of the inner circle 81 (a counterclockwise side of the two arcs), and a second region 812 of the inner circle 81 (a clockwise side of the two arcs). That is, half of the arc from the 0 o'clock position 81*a* to the 1:30 position 81*b* of the inner circle 81 on the 0 o'clock side is the first region 811 of the inner circle 81, and half of the arc on the 1:30 side is the second region 812 of the inner circle 81. In the planned formation region 83 of the first component 71, a position in the first region 811 of the inner circle 81 is the drawing start position of the filament 11. A position in the second region 812 of the inner circle 81 is the drawing end position of the filament 11.

Figure 32:
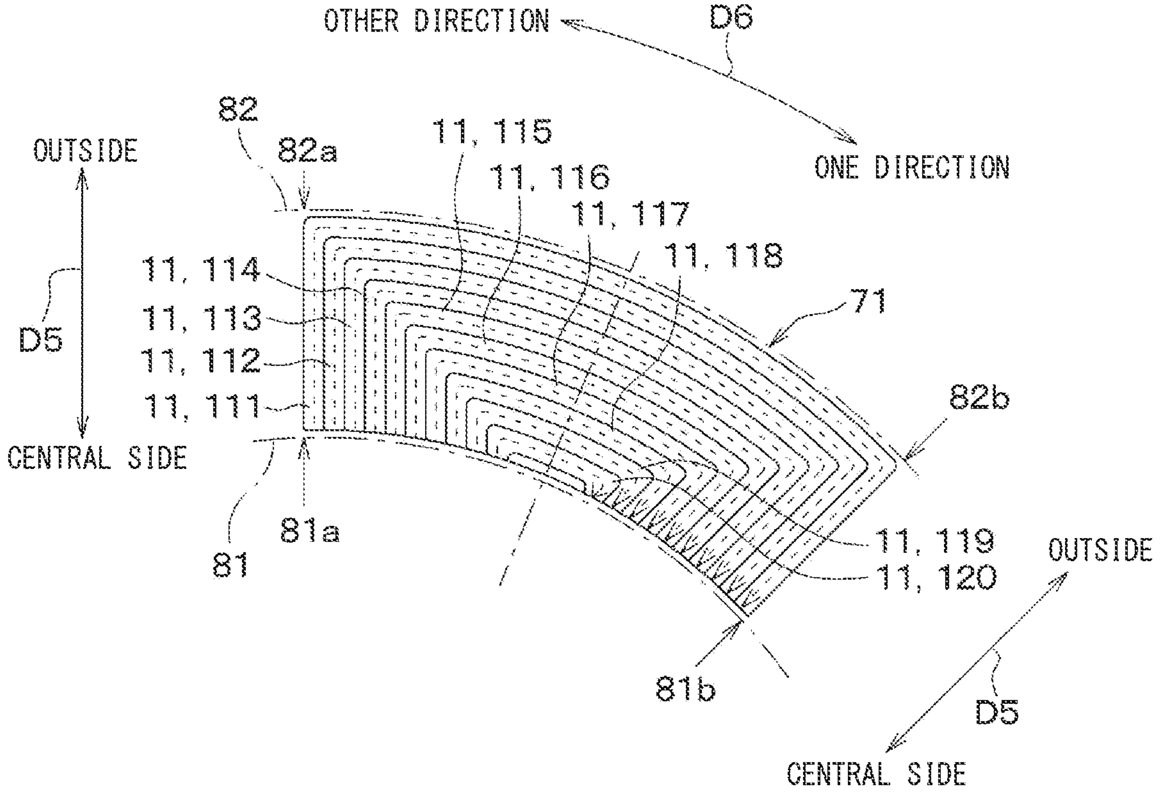
FIG. 32 is a diagram for explaining the arrangement of a plurality of filaments for forming the first component in the method for manufacturing a bond magnet in the second embodiment.

As shown in FIG. 32, the first filament 111 serving as the filament 11 is drawn in a U shape along a broken line arrow in FIG. 32. That is, the first filament 111 is drawn from the 0 o'clock position 81*a* of the inner circle 81 to the 0 o'clock position 82*a* of the outer circle 82, that is, from inside toward the outside along the radial direction D5 of the outer circle 82. Subsequently, the first filament 111 is further drawn from the 0 o'clock position 82*a* of the outer circle 82 toward one side (i.e., a clockwise side) of the outer circle 82 along the circumferential direction D6. That is, the filament 111 is drawn up to a position of the outer circle 82 away from the position 82*a* by the length of a fan-shaped arc of the central angle θ71 in the first component 71. The position corresponding to the length of the fan-shaped arc at the central angle θ71 is the position 82*b* at 1:30 of the outer circle 82. Subsequently, the first filament 111 is further drawn toward the center side along the radial direction D5 up to the position 81*b* at 1:30 of the inner circle 81.

Next, the second filament 112 serving as the filament 11 is drawn in a U shape adjacent to the first filament 111 along the broken line arrow in FIG. 32. That is, the second filament 112 is adjacently drawn next to the first filament 111 from a position clockwise next to the position 81*a* (with respect to 0 o'clock of the inner circle 81) toward outside along the radial direction D5, then to one of the circumferential directions D6, and then toward the center along the radial direction D5.

Next, the third filament 113 serving as the filament 11 is drawn in a U shape adjacent to the second filament 112 along the broken line arrow in FIG. 32. That is, the third filament 113 is adjacently drawn next to the second filament 112 from a position close to the position 81*a* (with respect to 0 o'clock of the inner circle 81) toward outside along the radial direction D5, then to one of the circumferential directions D6, and then toward the center along the radial direction D5.

Similarly, each of the fourth filament 114 to the tenth filament 120 respectively serving as the filament 11 is drawn in a U shape so as to be adjacent to the previously drawn filament 11 in ascending order of the fourth to tenth numbers. In such manner, each of the plurality of filaments 11 is arranged in a U shape adjacent to each other, whereby the first component 71 shown in FIG. 30 is formed.

Subsequently, the second component 72 is formed as follows. As shown in FIG. 31, of the outer circle 82 and the inner circle 81, positions 82*b* and 81*b* at 1:30 of the analog clock to positions 82*c* and 81*c* at 3:00 respectively define a planned formation region 84 of the second component 72. In the planned formation region 84 of the second component 72, the two arcs of the inner circle 81 whose central angle is ½ of the angle of the central angle θ72 of the second component 72 are designated as a third region 813 of the inner circle 81 (a counterclockwise side of the two arcs), and a fourth region 814 of the inner circle 81 (a clockwise side of the two arcs). That is, half of the arc from the position 81*b* at 1:30 of the inner circle 81 to the position 81*c* at 3 o'clock on the 1:30 side is the third region 813 of the inner circle 81, and half of the arc on the 3 o'clock side is the fourth region 814 of the inner circle 81. In the planned formation region 84 of the second component 72, a position in the fourth region 814 of the inner circle 81 is the drawing start position of the filament 11. A position in the third region 813 of the inner circle 81 is the drawing end position of the filament 11.

Figure 33:
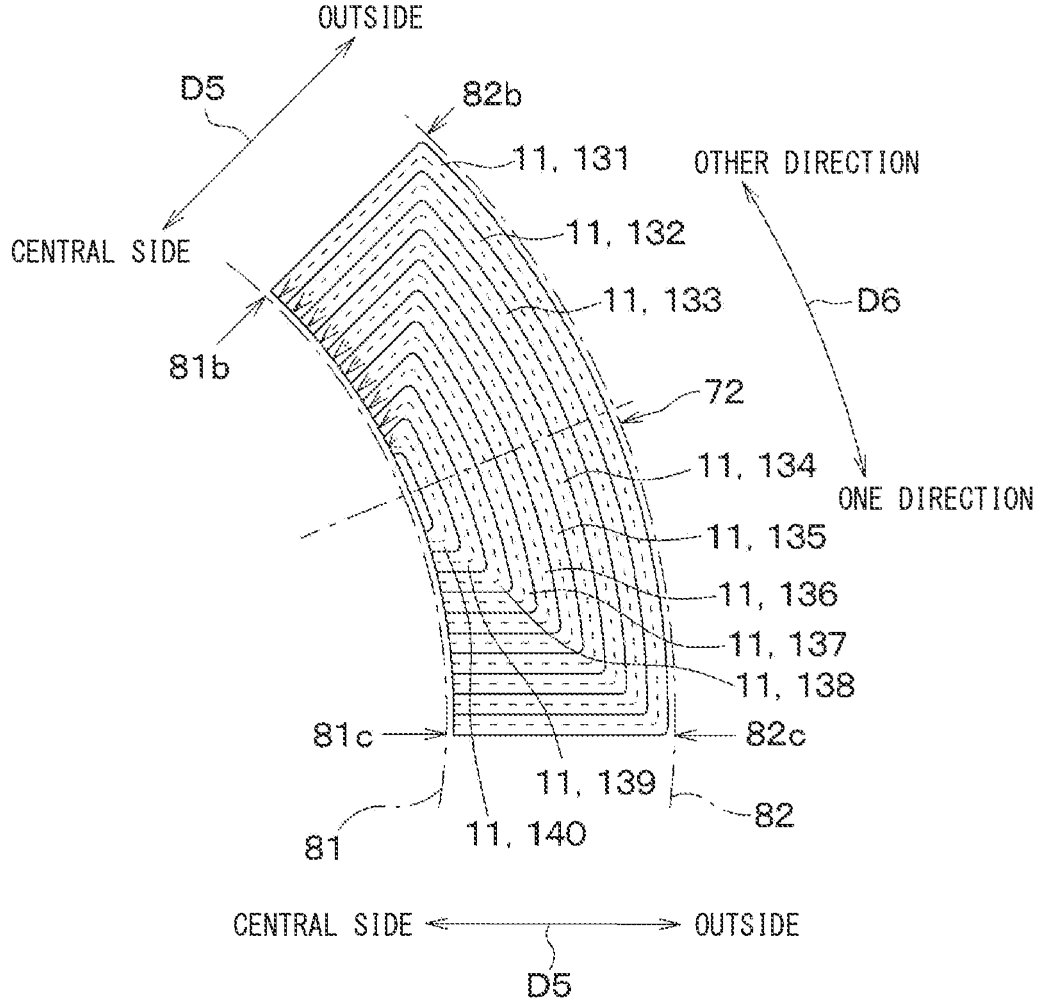
FIG. 33 is a diagram for explaining the arrangement of a plurality of filaments for forming a second component in the method for manufacturing a bond magnet in the second embodiment.

As shown in FIG. 33, the 21st filament 131 serving as the filament 11 is drawn in a U shape along the broken line arrow in FIG. 33. That is, the 21st filament 131 is drawn from the 3 o'clock position 81*c* of the inner circle 81 to the 3 o'clock position 82*c* of the outer circle 82 toward the outside along the radial direction D5. Subsequently, the 21st filament 131 is further drawn from the 3 o'clock position 82*c* of the outer circle 82 toward the other side (i.e., a counterclockwise side) of the outer circle 82 along the circumferential direction D6. That is, the filament 11 is drawn up to a position of the outer circle 82 away from the position 82*c* by the length of a fan-shaped arc of the central angle θ72 in the second component 72. The position corresponding to the length of the fan-shaped arc at the central angle θ72 is the position 82*b* at 1:30 of the outer circle 82. Subsequently, the 21st filament 131 is further drawn toward the center side along the radial direction D5 up to the position 81*b* at 1:30 of the inner circle 81. At such timing, the 21st filament 131 is brought adjacent to the first filament 111 of the first component 71 in FIG. 32.

Next, the 22nd filament 132 serving as the filament 11 is drawn in a U shape adjacent to the 21st filament 131 along the broken line arrow in FIG. 33. That is, the 22nd filament 132 is adjacently drawn next to the 21st filament 131, from a position adjacent to the counterclockwise side of the 3 o'clock position 81*c* of the inner circle 81 toward the outside along the radial direction D5, then to one of the circumferential directions D6, and then toward the center along the radial direction D5.

Next, the 23rd filament 133 serving as the filament 11 is drawn in a U shape adjacent to the 22nd filament 132 along the broken line arrow in FIG. 33. That is, the 23rd filament 133 is adjacently drawn to the 22nd filament 132 from a next adjacent position on a counterclockwise side with respect to the 3 o'clock position 81*c* of the inner circle 81 toward the outside along the radial direction D5, then to one of the circumferential directions D6, and then toward the center along the radial direction D5.

Similarly, each of the 24th filament 134 to the 30th filament 140 respectively serving as the filament 11 is drawn in a U shape so as to be adjacent to the previously drawn filament 11 in ascending order from the smallest to the largest number of the 24th to 30th. In such manner, each of the plurality of filaments 11 is arranged in a U shape adjacent to each other, whereby the second component 72 shown in FIG. 30 is formed.

In such manner, after one set of basic components 70 shown in FIG. 30 is formed, the other three sets of basic components 70 are also formed in the same manner. As shown in FIG. 28, one ring-shaped body 73 is formed by using four sets of basic components 70, i.e., by combining adjacent sets of components 70 side by side along the circumferential direction.

Further, as shown in FIG. 29, a plurality of the ring-shaped bodies 73 respectively having the same configuration are laminated/stacked along the direction D1 parallel to the center line CL2 of each of the ring-shaped bodies 73. At such timing, the phases of the magnetic poles on the inner peripheral surface 73*a* of the ring-shaped body 73 are the same, i.e., matched to each other. That is, in each of the plurality of laminated ring-shaped bodies 73, the positions of the four sets of basic components 70 along the circumferential direction are the same. In such manner, the ring-shaped bond magnet 60 is manufactured.

As described above, the bond magnet 60 of the present embodiment includes a plurality of sets of basic components 70 in which the first component 71 and the second component 72 are provided as one set of basic components 70. Each of the plurality of sets of basic components 70 forms one ring-shaped body 73 by an arrangement and connection to each other along the circumferential direction D2 about the center line CL2. In each of the plurality of sets of basic components 70, the second component 72 is adjacent to one side in the circumferential direction with respect to the first component 71. Each of the first component 71 and the second component 72 is composed of at least a plurality of filaments 11 bonded to each other.

The one end 11*c* and the other end 11*d* of each of the plurality of filaments 11 of the first component 71 are located on the inner peripheral surface 73*a* of the ring-shaped body 73. Each of the plurality of filaments 11 of the first component 71 extends and spreads from the one end 11*c* toward the outer peripheral surface 73*b* along the radial direction D3, changes its direction to extend and spread toward one of the circumferential directions D2, and further changes its direction to extend and spread toward the other end 11*d* along the radial direction D3. The arrangement of the plurality of filaments 11 of the second component 72 is the same as that of the first component 71.

In each of the plurality of filaments 11 of the first component 71, the direction of the magnetic moment of the magnetic powder 12 at each of different portions along the center line CL1 of the filament 11 is (set as) a direction along the center line CL1 of the filament 11, and a direction from the N pole on the one end 11*c* to the S pole on the other end 11*d*. On the other hand, in each of the plurality of filaments 11 of the second component 72, the direction of the magnetic moment of the magnetic powder 12 at each of different portions along the center line CL1 of the filament 11 is (set as) a direction along the center line CL1 of the filament 11, and a direction from the S pole on the one end 11*c* to the N pole on the other end 11*d*.

Here, the magnet used for the outer rotor 53 of the motor 51 is required to have a high surface magnetic flux density on the inner peripheral surface which is the working surface. According to the bond magnet 60 of the present embodiment, magnetic poles are mainly generated on the inner peripheral surface, and the magnetic flux inside the bond magnet 60 is formed to extend and spread along the radial direction or a direction close thereto toward the inner peripheral surface. A magnetic flux is formed. Therefore, it is possible to increase the radial component of the magnetic flux extending from the inner peripheral surface to an outside. Therefore, according to the bond magnet 60 of the present embodiment, the surface magnetic flux density of the inner peripheral surface can be increased.

Figure 24:
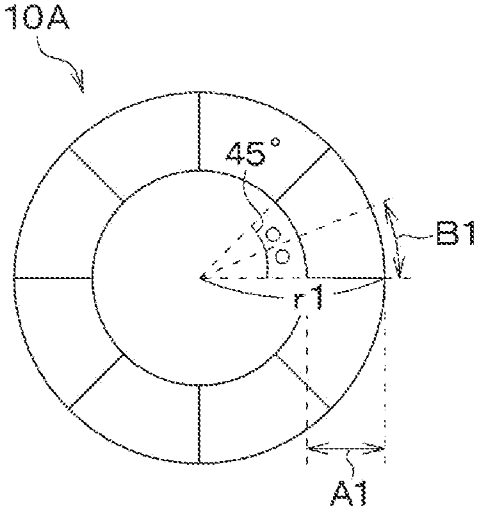
FIG. 24 is a plan view of a bond magnet of a modified example of the first embodiment.
Figure 25:
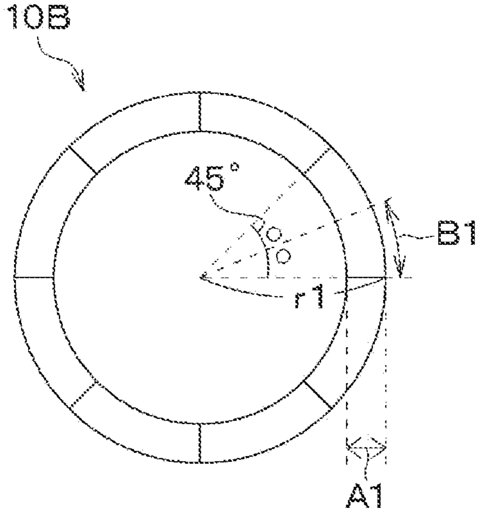
FIG. 25 is a plan view of a bond magnet according to another modified example of the first embodiment.

Note that, in the bond magnet 60 of the present embodiment, A1/B1 is 1. However, as described in the first embodiment and as shown in FIGS. 24 and 25, A1/B1 may be a value other than 1 that is greater than 0 and less than 2. According to the present embodiment, it is possible to obtain a bond magnet having a ring shape in which A1/B1 is smaller than 2 and having a high surface magnetic flux density on the inner peripheral surface.

Third Embodiment

Figure 34:
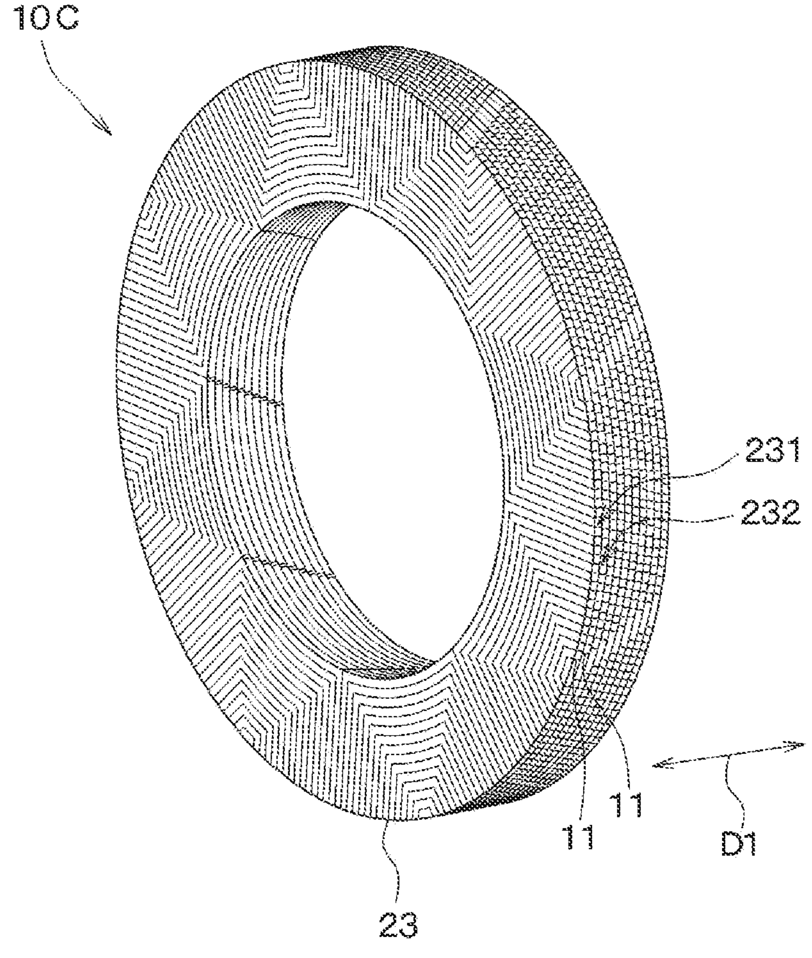
FIG. 34 is a perspective view of a bond magnet according to a third embodiment.
Figure 35:
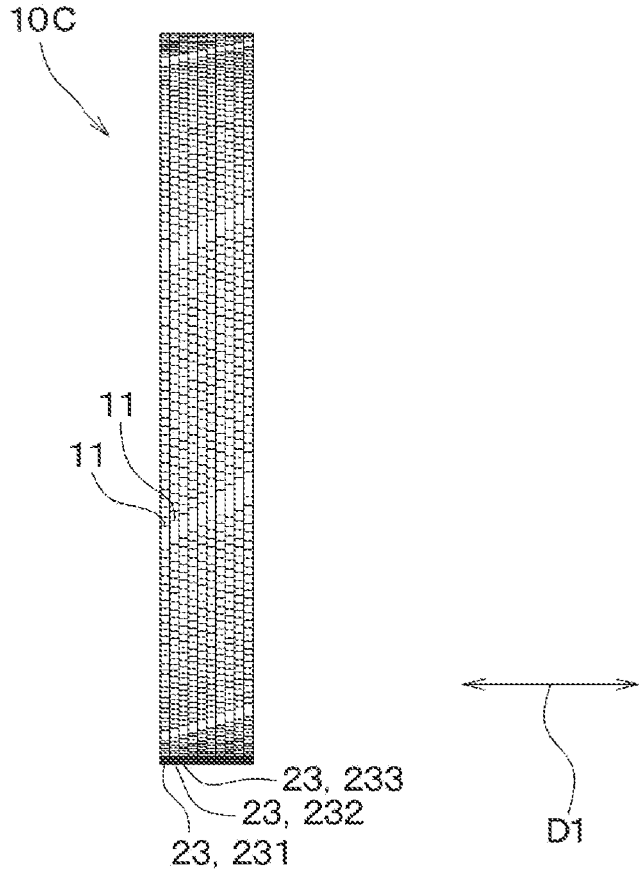
FIG. 35 is a side view of the bond magnet according to the third embodiment.

As shown in FIGS. 34 and 35, in a bond magnet 100 of the present embodiment, a plurality of ring-shaped bodies 23 are laminated just like the bond magnet 10 of the first embodiment. The structure of each of the ring-shaped bodies 23 is the same as that of the bond magnet 10 of the first embodiment.

In the bond magnet 100 of the present embodiment, unlike the bond magnet 10 of the first embodiment, the phases of the magnetic poles of the plurality of ring-shaped bodies 23 are deviated/shifted by a predetermined amount along the circumferential direction. That is, the phases of the magnetic poles existing on the outer peripheral surface of the second ring-shaped body 232 are deviated/shifted by a predetermined amount along the circumferential direction with respect to the magnetic poles existing on the outer peripheral surface of the first ring-shaped body 231. The phases of the magnetic poles existing on the outer peripheral surface of the third ring-shaped body 233 are deviated/shifted by a predetermined amount along the circumferential direction with respect to the magnetic poles existing on the outer peripheral surface of the second ring-shaped body 232. Further, in other words, in the first ring-shaped body 231 and the second ring-shaped body 232, attention is paid to the filament 11 having the same shape and magnetic moment with each other. The position of an end portion of the filament 11 existing on the outer peripheral surface of the second ring-shaped body 232 is shifted along the circumferential direction with respect to the position of an end portion of the filament 11 existing on the outer peripheral surface of the first ring-shaped body 231 by a predetermined amount. The predetermined amount is, for example, 10 degrees at an angle of rotation about the center position of the ring-shaped body 23.

According to the bond magnet 10C of the present embodiment, since the S pole or the N pole gradually increases along the circumferential direction, torque fluctuation is small and rotation of the inner rotor 3 is made smoother. Note that, in the bond magnet 100 of the present embodiment, it may be sufficient that at least two ring-shaped bodies 23 are laminated.

Fourth Embodiment

Figure 36:
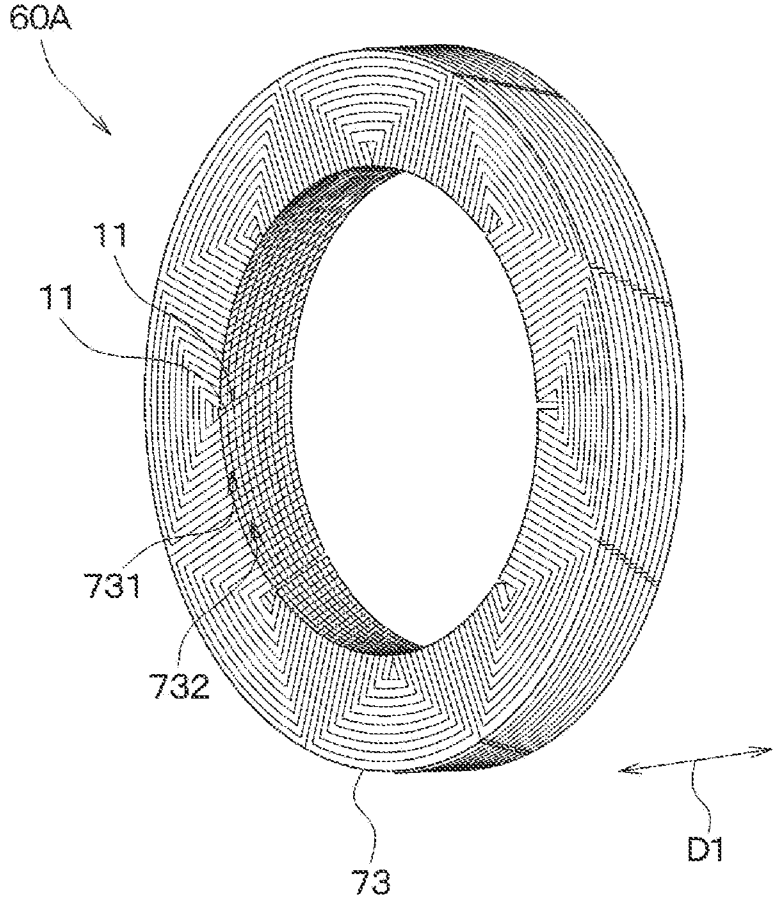
FIG. 36 is a perspective view of a bond magnet according to a fourth embodiment.
Figure 37:
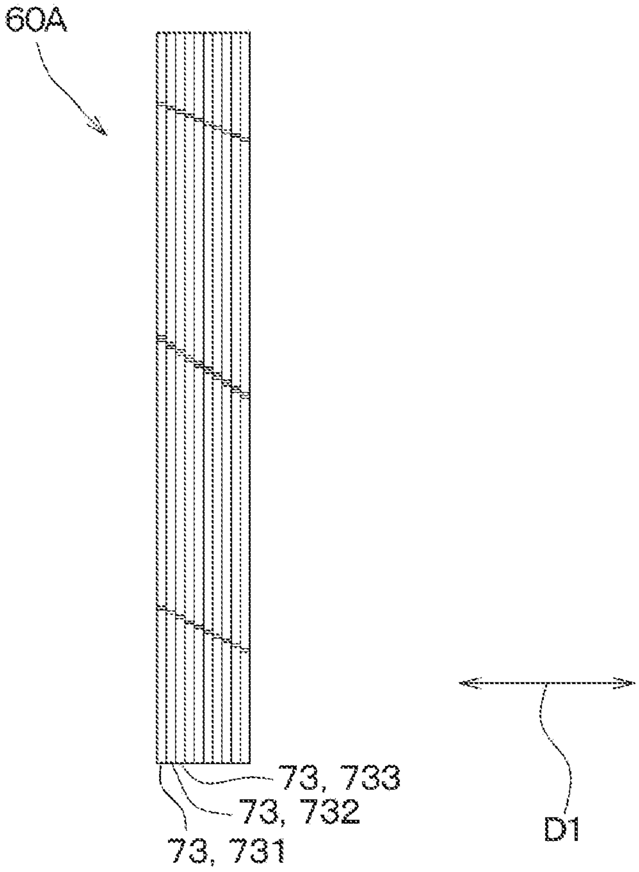
FIG. 37 is a side view of the bond magnet according to the fourth embodiment.

As shown in FIGS. 36 and 37, in a bond magnet 60A of the present embodiment, a plurality of ring-shaped bodies 73 are laminated as in the bond magnet 60 of the second embodiment. The structure of each of the ring-shaped bodies 73 is the same as that of the bond magnet 60 of the second embodiment.

In the bond magnet 60A of the present embodiment, unlike the bond magnet 60 of the second embodiment, the phases of the magnetic poles of the plurality of ring-shaped bodies 73 are deviated by a predetermined amount along the circumferential direction. That is, the phases of the magnetic poles existing on the inner peripheral surface of the second ring-shaped body 732 are deviated by a predetermined amount along the circumferential direction with respect to the magnetic poles existing on the inner peripheral surface of the first ring-shaped body 731. The phases of the magnetic poles existing on the inner peripheral surface of the third ring-shaped body 733 are deviated by a predetermined amount along the circumferential direction with respect to the magnetic poles existing on the inner peripheral surface of the second ring-shaped body 732. Further, in other words, as shown in FIG. 36, regarding the first ring-shaped body 731 and the second ring-shaped body 732, attention is paid to the filament 11 having the same shape and magnetic moment with each other. The position of an end portion of the filament 11 existing on the inner peripheral surface of the second ring-shaped body 732 is deviated along the circumferential direction with respect to the position of an end portion of the filament 11 existing on the inner peripheral surface of the first ring-shaped body 731 by a predetermined amount. The predetermined amount is, for example, 10 degrees at an angle of rotation about the center position of the ring-shaped body 23.

According to the bond magnet 60A of the present embodiment, since the S pole or the N pole gradually increases along the circumferential direction, torque fluctuation is small and rotation of the outer rotor 53 is made smoother. Note that, in the bond magnet 60A of the present embodiment, it may be sufficient that at least two ring-shaped bodies 73 are laminated.

Other Embodiments (1) In the first to fourth embodiments, the central angles θ20 and θ70 of the basic components 20 and 70 are 45 degrees. Therefore, the number of magnetic poles on the working surface of the bond magnets 10, 100, 60, and 60A is eight. However, the central angles θ20 and θ70 can be changed within the range of 11.25 degrees to 180 degrees. When the central angles θ20 and θ70 are 11.25 degrees, the number of magnetic poles on the working surface of the bond magnet is 32. When the central angles θ20 and θ70 are 180 degrees, the number of magnetic poles on the working surface of the bond magnet is 2.

(2) In the bond magnet 10 of the first embodiment, the first component 21 is composed of 15 filaments 11 of the first filament 111 to the fifteenth filament 125. Similarly, the second component 22 is composed of 15 filaments 11 of the 21st filament 131 to the 35th filament 145. However, the number of the plurality of filaments 11 constituting the first component 21 and the second component 22 can be arbitrarily changed. Similarly, in the bond magnet 60 of the second embodiment, the number of the plurality of filaments 11 constituting the first component 71 and the second component 72 can be arbitrarily changed.

(3) In the first embodiment, regarding the manufacturing of the bond magnet 10, the first filament 111 to fifteenth filament 125 are arranged in ascending order of the first to fifteenth numbers in order to form the first component 21. However, the order in which the first filament 111 to the fifteenth filament 125 are arranged is not limited to such. The first filament 111 to the fifteenth filament 125 may arbitrarily be arranged as long as the first component 21 is formed. For example, the first filament 111 to the fifteenth filament 125 may be arranged in descending order of the first to fifteenth numbers. The same applies to the formation of the second component 22.

Similarly, in the second embodiment, regarding the manufacturing of the bond magnet 60, the first filament 111 to the tenth filament 120 are arranged in ascending order of the first to tenth numbers in order to form the first component 71. However, the order in which the first filament 111 to the tenth filament 120 are arranged is not limited to such. The first filament 111 to the tenth filament 120 may arbitrarily be arranged as long as the first component 71 is formed. The same applies to the formation of the second component 72.

Figure 38:
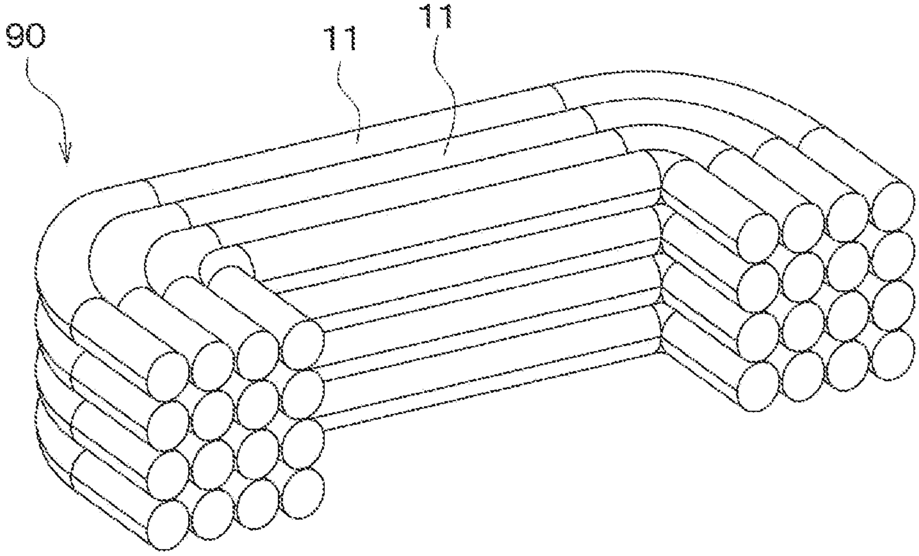
FIG. 38 is a perspective view of the bond magnet according to another embodiment.

(4) The shape of the bond magnet is not limited to the first to fourth embodiments. Like a bond magnet 90 shown in FIG. 38, the bond magnet may have a shape other than the ring shape as long as it is composed of a plurality of filaments 11 bonded to each other. In the bond magnet 90 shown in FIG. 38, one filament 11 has two bent portions. However, the entire filament 11 may be linear (i.e., may have a straight rod shape).

Figure 39:
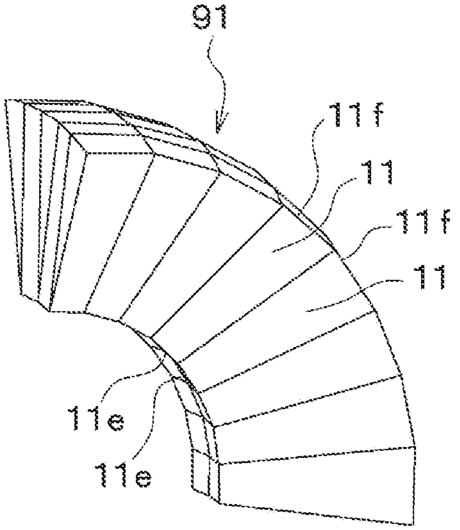
FIG. 39 is a perspective view of a bond magnet according to another embodiment.
Figure 40:
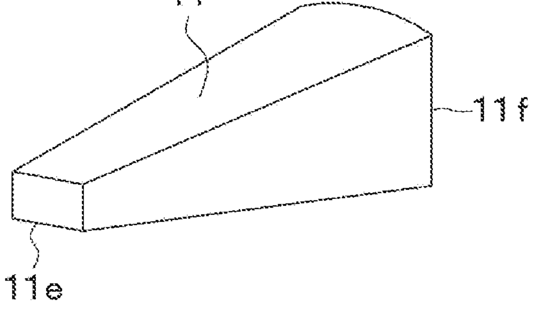
FIG. 40 is a perspective view of one filament constituting the bond magnet of FIG. 39.

(5) A bond magnet 91 shown in FIG. 39 includes a plurality of filaments 11 bonded to each other. The plurality of filaments 11 are arranged along a width direction of the filament 11. As shown in FIG. 40, each of the plurality of filaments 11 constituting the bond magnet 91 extends and spreads linearly from one end 11*e* to an other end 11*f*. Further, the width (that is, thickness) of the filament 11 gradually increases from the one end 11*e* toward the other end 11*f*. As a result, a plurality of filaments 11 are arranged along the width direction of the filament 11 to form (as shown in FIG. 39) a part of the ring shape.

As described above, in one filament 11 out of the plurality of filaments 11, there is a portion where the thickness of the filament 11 is different. According to such configuration, by making the thickness of the filament 11 different depending on portions in one filament 11, the degree of freedom in the shape of the bond magnet composed of the plurality of filaments 11 can be increased.

(6) In each of the above-described embodiments, as shown in FIG. 11, the direction of the magnetic field formed inside the nozzle 33 is for making/aligning the direction of the magnetic moment of the magnetic powder 12 in parallel with the axial direction of the nozzle 33 and making it aligned as a front side N pole with respect to the traveling direction D4 of the composite material 14. However, the direction of the magnetic field may be other than the above, i.e., may be for making/aligning the direction of the magnetic moment of the magnetic powder 12 in parallel with the axial direction of the nozzle 33 and making it aligned as a front side S pole with respect to the traveling direction D4 of the composite material 14.

Figure 41:
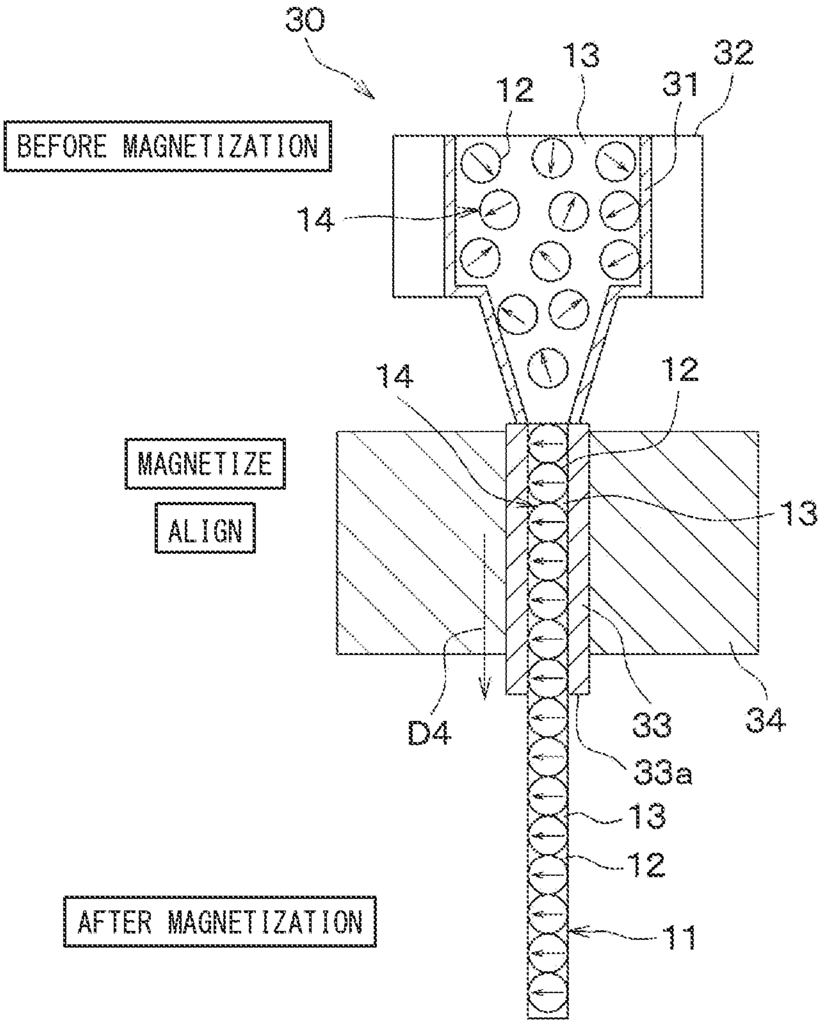
FIG. 41 is a cross-sectional view of a bond magnet manufacturing apparatus according to another embodiment.

Further, in order to set the direction of the magnetic moment of the magnetic powder 12 as the target direction, the direction of the magnetic field may be another direction. For example, as shown in FIG. 41, the direction of the magnetic field may be the one with which the direction of the magnetic moment of the magnetic powder 12 is aligned perpendicular to the axial direction of the nozzle 33. In such case, as the composite material 14 moves inside the nozzle 33, the direction of the magnetic moment of the magnetic powder 12 in the composite material 14 becomes a direction perpendicular to the axial direction of the nozzle 33. In each of the above plurality of filaments 11 that are bonded to each other to form a bond magnet, the direction of the magnetic moment of the magnetic powder 12 generated as the sum of the magnetic moments of each particle of the magnetic powder 12 at each of portions along the center line CL1 of the filament 11 is a direction perpendicular to the center line CL1 of the filament 11 (that is, the direction forming 90 degrees thereto).

(5) The present disclosure is not limited to the foregoing description of the embodiments and can be modified within the scope of the present disclosure. The present disclosure may also be modified in many ways. Such modifications are not to be regarded as departure from the disclosure, and all of such modifications are intended to be encompassed within the scope of the disclosure.

The embodiments described above are not independent of each other, and can be appropriately combined except when the combination is obviously impossible.

Individual elements or features of a particular embodiment are not necessarily essential unless it is specifically stated that the elements or the features are essential in the foregoing description, or unless the elements or the features are obviously essential in principle.

Furthermore, in each of the above embodiments, even in case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure.

Furthermore, a material, a shape, a positional relationship, or the like, if specified in the above-described embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

What is claimed is:

1. A bond magnet comprising:

a first filament; and a second filament, wherein the filaments are bonded to each other to form a bond magnet, each of the filaments is a filamentous member containing a resin material and magnetic powder dispersed in the resin material, and has magnetic anisotropy, and in each of the filaments, a direction of a magnetic moment of the magnetic powder, which is a sum of the magnetic moments of each particle of the magnetic powder at each portion, is aligned in a direction substantially along a center line of the filament, forming a predetermined angle therefrom.

2. The bond magnet of claim 1, wherein one of the filaments includes a portion having a different thickness from other portions of the filament.

3. A method of manufacturing the bond magnet of claim 1, the method comprising steps of:

heating a composite material containing the resin material and the magnetic powder to melt the resin material, passing the composite material in a state of molten resin through an inside of a nozzle where a magnetic field is formed to magnetize the magnetic powder and to magnetically align the magnetic powder in a certain direction, and extruding the composite material with the magnetic powder aligned therein from a tip of the nozzle to form and arrange the filaments, wherein the filaments form the bond magnet having a predetermined shape.

4. A bond magnet comprising:

a first filament; and a second filament, wherein the filaments are bonded to each other to form a bond magnet, each of the filaments is a filamentous member containing a resin material and magnetic powder dispersed in the resin material, and has magnetic anisotropy, and a surface layer portion of one of the plurality of filaments has a ratio of the resin material to the magnetic powder greater as compared with a central portion on a central side of the surface layer portion of the one filament.

5. A bond magnet comprising:

a first set of basic components; and a second set of basic components, wherein the sets of basic components include a first component and a second component as one set thereof, the sets of basic components form one ring-shaped body by arranging each of the plurality of sets of basic components in a circumferential direction with respect to a center line and connecting to each other, the ring-shaped body includes an inner peripheral surface of the ring-shaped body located inside in a radial direction with respect to the center line and an outer peripheral surface of the ring-shaped body located outside in the radial direction, in each of the sets of basic components, the second component is adjacent to one side in the circumferential direction with respect to the first component, each of the first component and the second component is composed of at least filaments bonded to each other, each of the filaments is a filamentous member containing a resin material and magnetic powder dispersed in the resin material, one end and an other end of each of the filaments composing the first component are located on the outer peripheral surface, each of the filaments of the first component extends and spreads along the radial direction from the one end toward the inner peripheral surface, changes its direction and extends and spreads toward one way in the circumferential direction, and further changes its direction and extends and spreads along the radial direction toward the other end, in each of the filaments of the first component, the direction of the magnetic moment of the magnetic powder, which is the total magnetic moment of each particle of the magnetic powder at each portion along the center line of the filament, is a direction along the center line of the filament, and a magnetic pole on the one end is a first pole, and a magnetic pole on the other end is a second pole, one end and an other end of each of the filaments of the second component are located on the outer peripheral surface, each of the filaments of the second component extends and spreads along the radial direction from the one end toward the inner peripheral surface, changes its direction and extends and spreads toward one way in the circumferential direction, and further changes its direction and extends and spreads along the radial direction toward the other end, and in each of the filaments of the second component, a direction of magnetic moment of the magnetic powder, which is a total magnetic moment of each particle of the magnetic powder at each portion along the center line of the filament, is a direction along the center line of the filament, and a magnetic pole on the one end is a second pole and a magnetic pole on the other end is a first pole.

6. The bond magnet of claim 5, wherein the ring-shaped body is a first ring-shaped body, a second ring-shaped body having a same structure as the first ring-shaped body is laminated on the first ring-shaped body in a direction along the center line of the first ring-shaped body, and phases of the magnetic poles existing on the outer peripheral surface of the second ring-shaped body are deviated along the circumferential direction with respect to the magnetic poles existing on the outer peripheral surface of the first ring-shaped body.

7. The bond magnet of claim 5, wherein when a radial length of the ring-shaped body is A1, a radius is same as a radius of the outer peripheral surface, a length of a fan-shaped arc having a central angle of 22.5 degrees is B1, and A1/B1 is greater than 0 and less than 2.

8. A method of manufacturing the bond magnet of claim 5, the method comprising steps of:

heating a composite material containing the resin material and the magnetic powder to melt the resin material, passing the composite material in a state of molten resin through an inside of a nozzle where a magnetic field is formed to magnetize the magnetic powder and to magnetically align the magnetic powder in a certain direction, and extruding the composite material with the magnetic powder aligned therein from a tip of the nozzle to form and arrange the filaments, wherein the filaments form the first component and the second component.

* * * * *